US008169671B2

(12) United States Patent
Itoh et al.

(10) Patent No.: US 8,169,671 B2
(45) Date of Patent: May 1, 2012

(54) LIGHTING UNIT, IMAGE READING APPARATUS AND IMAGE FORMING APPARATUS USING THE SAME

(75) Inventors: Masahiro Itoh, Sagamihara (JP); Yasuo Sakurai, Yokohama (JP); Kiichiro Nishina, Yokohama (JP); Nobuaki Ono, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 379 days.

(21) Appl. No.: 12/485,699

(22) Filed: Jun. 16, 2009

(65) Prior Publication Data
US 2009/0323139 A1  Dec. 31, 2009

(30) Foreign Application Priority Data

Jun. 30, 2008  (JP) ................................. 2008-170642
Jul. 1, 2008  (JP) ................................. 2008-172310

(51) Int. Cl.
*H04N 1/04* (2006.01)
(52) U.S. Cl. ......... 358/474; 358/471; 358/497; 358/498
(58) Field of Classification Search .................. 358/474, 358/471, 497, 498
See application file for complete search history.

(56) References Cited

U.S. PATENT DOCUMENTS

| 4,638,987 | A |  | 1/1987 | Sakurai |  |
|---|---|---|---|---|---|
| 4,715,597 | A |  | 12/1987 | Sakurai et al. |  |
| 5,124,837 | A |  | 6/1992 | Ono et al. |  |
| 7,115,384 | B2 | * | 10/2006 | Clark et al. | 435/29 |
| 7,209,702 | B2 |  | 4/2007 | Kohchi et al. |  |
| 7,280,256 | B2 | * | 10/2007 | Maurer et al. | 358/474 |
| 7,330,692 | B2 |  | 2/2008 | Kohchi et al. |  |
| 7,438,443 | B2 |  | 10/2008 | Tatsuno et al. |  |
| 7,446,953 | B2 |  | 11/2008 | Itoh et al. |  |
| 7,463,390 | B2 | * | 12/2008 | Hayakawa et al. | 358/452 |
| 2005/0088707 | A1 |  | 4/2005 | Sakurai et al. |  |
| 2006/0008295 | A1 |  | 1/2006 | Kohchi et al. |  |
| 2006/0187500 | A1 |  | 8/2006 | Sakurai |  |
| 2006/0197822 | A1 |  | 9/2006 | Sakurai |  |
| 2006/0279961 | A1 |  | 12/2006 | Sakurai |  |
| 2007/0216969 | A1 |  | 9/2007 | Nishina |  |
| 2007/0279712 | A1 |  | 12/2007 | Nishina |  |
| 2008/0063313 | A1 |  | 3/2008 | Nishina |  |
| 2008/0218724 | A1 |  | 9/2008 | Nishina et al. |  |
| 2008/0278779 | A1 |  | 11/2008 | Nishina et al. |  |

FOREIGN PATENT DOCUMENTS

| JP | 2002-142082 | A | 5/2002 |
|---|---|---|---|
| JP | 2004-157213 | A | 6/2004 |
| JP | 2005-027082 | A | 1/2005 |
| JP | 2005-241681 | A | 9/2005 |
| JP | 2006-042016 | A | 2/2006 |
| JP | 2006-067551 | A | 3/2006 |

* cited by examiner

*Primary Examiner* — Houshang Safaipour
(74) *Attorney, Agent, or Firm* — Dickstein Shapiro LLP

(57) ABSTRACT

A lighting unit, includes: a light source section wherein a plurality of light-emitting sources are arranged in a direction perpendicular to a direction of each light-emitting optical axis of each light-emitting source and linearly at predetermined intervals; and a reflecting section which reflects light emitted toward a direction along a document mounting surface from the light source section arranged along the document mounting surface toward an irradiated region of the document mounting surface, the reflecting section having: a first reflecting surface disposed closer to the light source section than to the irradiated region; and a second reflecting surface disposed more distant from the light source section than from the irradiated region.

11 Claims, 19 Drawing Sheets

FIG. 4
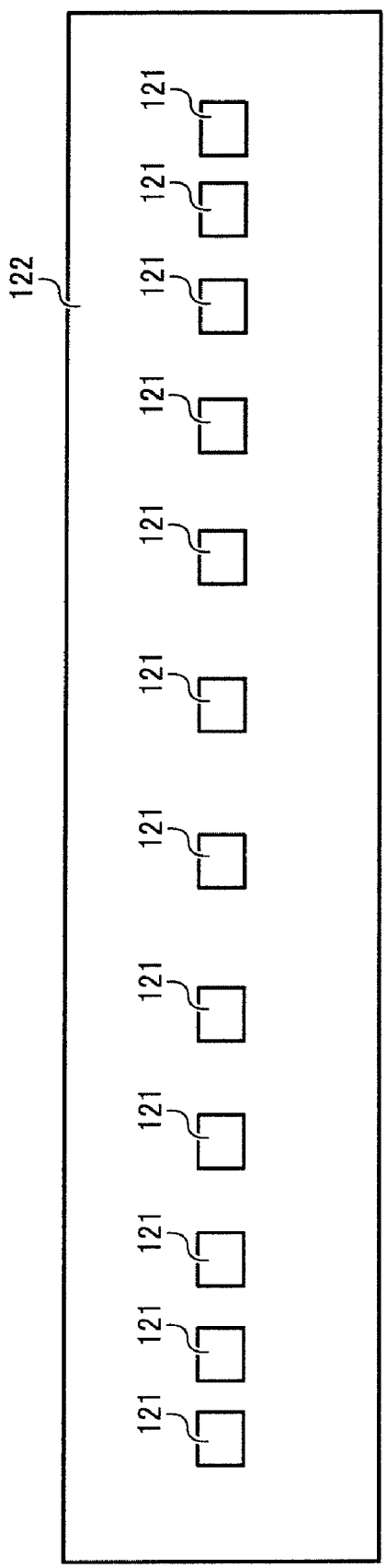
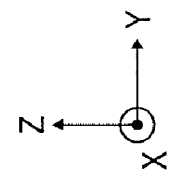

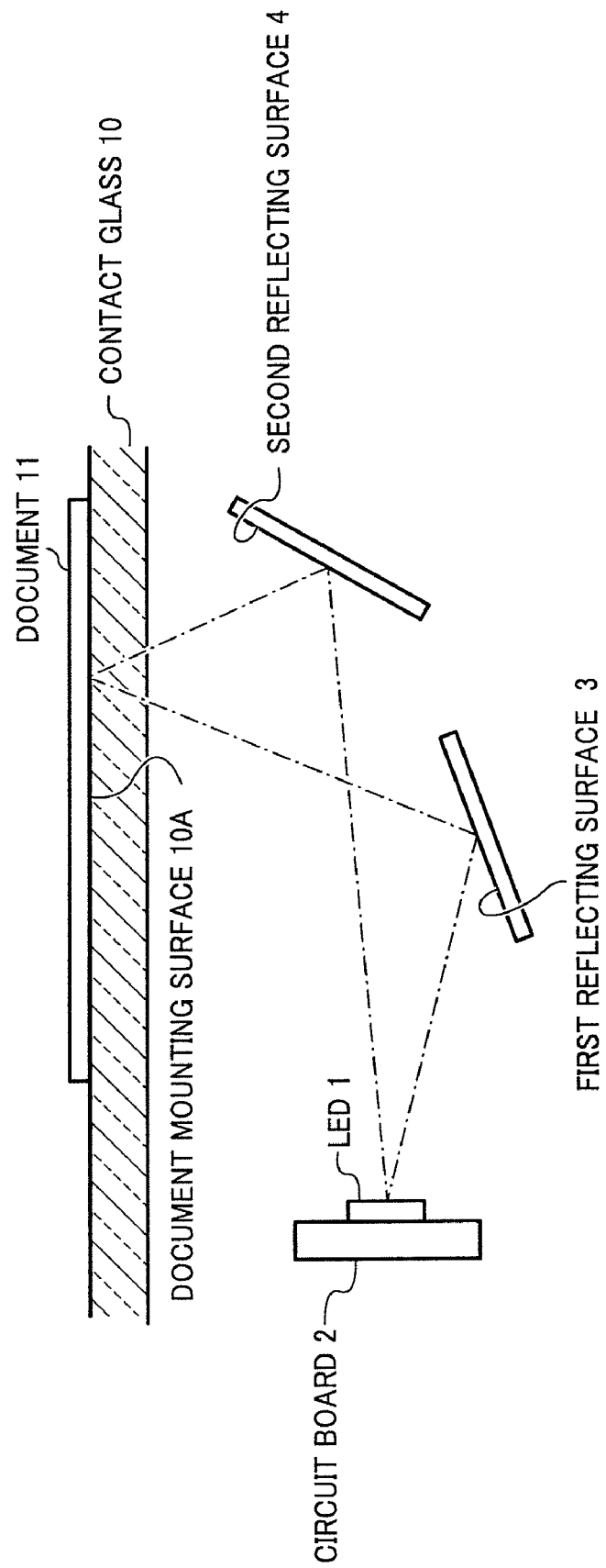

LIGHTING UNIT, IMAGE READING APPARATUS AND IMAGE FORMING APPARATUS USING THE SAME

CROSS-REFERENCE TO RELATED APPLICATIONS

The present application is based on and claims priority from Japanese patent application numbers 2008-170642, filed 30 Jun. 2008, and 2008-172310, filed 1 Jul. 2008, the disclosures of which are hereby incorporated by reference herein in their entireties.

BACKGROUND

The present invention relates to a lighting unit for a reading unit which is provided in an image reading apparatus such as a scanner or the like which reads an image on a document, or in an image forming apparatus such as a copier, a digital copier, a facsimile or the like, the image reading apparatus, and the image forming apparatus.

More specifically, the present invention relates to a lighting unit which illuminates an area (image reading area) where an image is read on a document placed on an image reading apparatus or on an image forming apparatus, the image reading apparatus provided with this lighting unit and a reading unit such that reflected light from the image reading area is imaged on an imaging sensor and image information is obtained by the imaging sensor, this image forming apparatus being provided with a similar reading unit to the above.

In an image reading apparatus such as a scanner or the like which reads an image on a document, or in an image forming apparatus such as a copier, a digital copier, a facsimile or the like, a lighting unit to illuminate an area where an image (image reading area) is read on the document placed on the image reading apparatus or the image forming apparatus is provided.

In these apparatuses, it is necessary to evenly illuminate the image reading area to accurately read the details of the image on the document.

There have been proposed many techniques to evenly illuminate the image reading area (for example, see Japanese patent publication numbers 2004-157213, 2005-027082, 2002-142082, 2005-241681, 2006-042016, and 2006-067551)

All apparatuses disclosed in Japanese patent publication numbers 2004-157213, 2005-027082, 2002-142082, 2005-241681, 2006-042016, and 2006-067551 have a lighting unit, and a light source, and a mirror which reflects illumination light from such a light source is provided with the lighting unit.

In the lighting unit disclosed in Japanese patent publication number 2005-027082, an LED (light-emitting diode) as a direct light source which illuminates a document directly, and an LED for reflected lighting are separately provided, which creates a high cost.

In addition, as the lighting unit disclosed in Japanese patent publication number 2005-027082, in a structure where a plurality of cylindrical-type LEDs from which a directional characteristic of emitted light is narrower than that from a surface-emitting-type LED and which is relatively large-sized and simply arranged side by side, an arrangement pitch of the LEDs is wide, and thereby unevenness of light in the image reading area can easily to occur.

The lighting unit disclosed in Japanese patent publication number 2002-142082 has 2 reflecting surfaces which are in a concave shape and face an LED.

In Japanese patent publication numbers 2005-241681, 2006-042016, and 2006-067551, a method of preventing unnecessary light scattering and lighting a document effectively is disclosed.

In Japanese patent publication numbers 2005-241681 and 2006-042016, a method of reducing the unevenness of light according to a structure of an LED arrangement is disclosed.

In these lighting units, the image reading area on a document is evenly lit by use of a mirror arrangement.

In apparatuses disclosed in Japanese patent publication numbers 2004-157213, 2005-027082, 2002-142082, 2005-241681, 2006-042016, and 2006-067551, the light amount of direct light from a light source and the light amount of indirect light by a mirror are asymmetric in a light source side and a mirror side of the image reading area on the document by light attenuation due to reflection by a mirror, or by a difference of each of the light path lengths.

By the way, for example, in a case where a document in which a piece which is cut away from another document (hereinafter, a second document) is pasted on an original document (hereinafter, a first document), what is called, a cut-and-paste document, is read, when light is emitted from outside of a pasted second document toward the pasted second document and when the light is emitted from the pasted second document toward the outside of the pasted second document, the state of a shadowing occurrence around the pasted second document may change.

Therefore, in the apparatuses disclosed in Japanese patent publication numbers 2004-157213, 2005-027082, 2002-142082, 2005-241681, 2006-042016, and 2006-067551 where the amount of emitted light is asymmetric in the light source side and the mirror side of the image reading area on the document, there is a possibility that either shadowing in the light source side or shadowing in the mirror side may occur as a result.

SUMMARY

An object of the present invention is to provide a lighting unit which lights evenly a reading part of a document and prevents shadowing from occurring on a cut-and-paste document, or on an edge of the document and is small-sized with a high efficiency, and an image reading apparatus and an image forming apparatus where the lighting unit is used.

To achieve the above object, an embodiment of the present invention provides a lighting unit, comprising: a light source section wherein a plurality of light-emitting sources are arranged in a direction perpendicular to a direction of each light-emitting optical axis of each light-emitting source and linearly at predetermined intervals; and a reflecting section which reflects light emitted toward a direction along a document mounting surface from the light source section arranged along the document mounting surface toward an irradiated region of the document mounting surface, the reflecting section including: a first reflecting surface disposed closer to the light source section than to the irradiated region; and a second reflecting surface disposed more distant from the light source section than from the irradiated region.

Preferably, a projected area onto a plane perpendicular to the direction of the light-emitting optical axis of an irradiation area of irradiation light on the second reflecting surface is larger than a projected area onto the plane perpendicular to the direction of the light-emitting optical axis of an irradiation area of irradiation light on the first reflecting surface.

Preferably, the light-emitting optical axis intersects either the first reflecting surface or the second reflecting surface.

Preferably, a ratio of a projected area of the first reflecting surface to a projected area of the second reflecting surface is approximately equal to a reciprocal of a ratio of a square of a distance from the light source section to the first reflecting surface to a square of a distance from the light source section to the second reflecting surface.

Preferably, a ratio of an extinction coefficient to a refractive index of the second reflecting surface with respect to a visible light region is larger than a ratio of an extinction coefficient of a refractive index of the first reflecting surface with respect to the visible light region.

Preferably, a range of wavelengths in the visible light region is 430 nm to 700 nm.

Preferably, the light-emitting sources emit a light in which light-emitting intensity in the light-emitting optical axis direction is the highest.

Preferably, the light-emitting sources are LEDs.

Preferably, at least one of the first reflecting surface and the second reflecting surface is in a concave-surface shape.

Preferably, the light-emitting sources are arranged such that adjacent intervals of each light-emitting source become gradually smaller toward both end parts from a center part of which the light-emitting sources are arranged linearly.

An embodiment of the present invention further provides an image reading apparatus which scans an image of a document placed on a document mounting surface and reads image information of the document by being moved relatively with respect to a document mounting surface, comprising: a lighting unit, including: a light source section wherein a plurality of light-emitting sources are arranged in a direction perpendicular to a direction of each light-emitting optical axis of each light-emitting source and linearly at predetermined intervals; and a reflecting section which reflects light emitted toward a direction along the document mounting surface from the light source section arranged along the document mounting surface toward an irradiated region of the document mounting surface, the reflecting section having: a first reflecting surface disposed closer to the light source section than to the irradiated region; and a second reflecting surface disposed more distant from the light source section than from the irradiated region; and an image reading section which reads an image of the irradiated region of the document placed on the document mounting surface.

An embodiment of the present invention further provides an image forming apparatus, comprising: an image reading apparatus which scans an image of a document mounted on a document mounting surface and reads image information of the document by being moved relatively with respect to the document mounting surface, including: a lighting unit, having: a light source section wherein a plurality of light-emitting sources are arranged in a direction perpendicular to a direction of each light-emitting optical axis of each light-emitting source and linearly at predetermined intervals; and a reflecting section which reflects light emitted from the light source section arranged along the document mounting surface toward an irradiated region of the document mounting surface, the reflecting section having: a first reflecting surface disposed closer to the light source section than to the irradiated region; and a second reflecting surface disposed more distant from the light source section than from the irradiated region; and an image reading section which reads an image of the irradiated region of the document placed on the document mounting surface.

BRIEF DESCRIPTION OF THE DRAWINGS

FIG. 4 is a diagram illustrating a layout of LEDs 121.

FIG. 9 is a schematic diagram illustrating a structure a lighting unit of embodiment 2 according to the present invention.

DETAILED DESCRIPTION OF THE PREFERRED EMBODIMENTS

Embodiment 1

Hereinafter, an embodiment 1 will be explained based on FIGS. 1 to 6B.

[Structure of Image Forming Apparatus of Embodiment 1]

Figure 1:
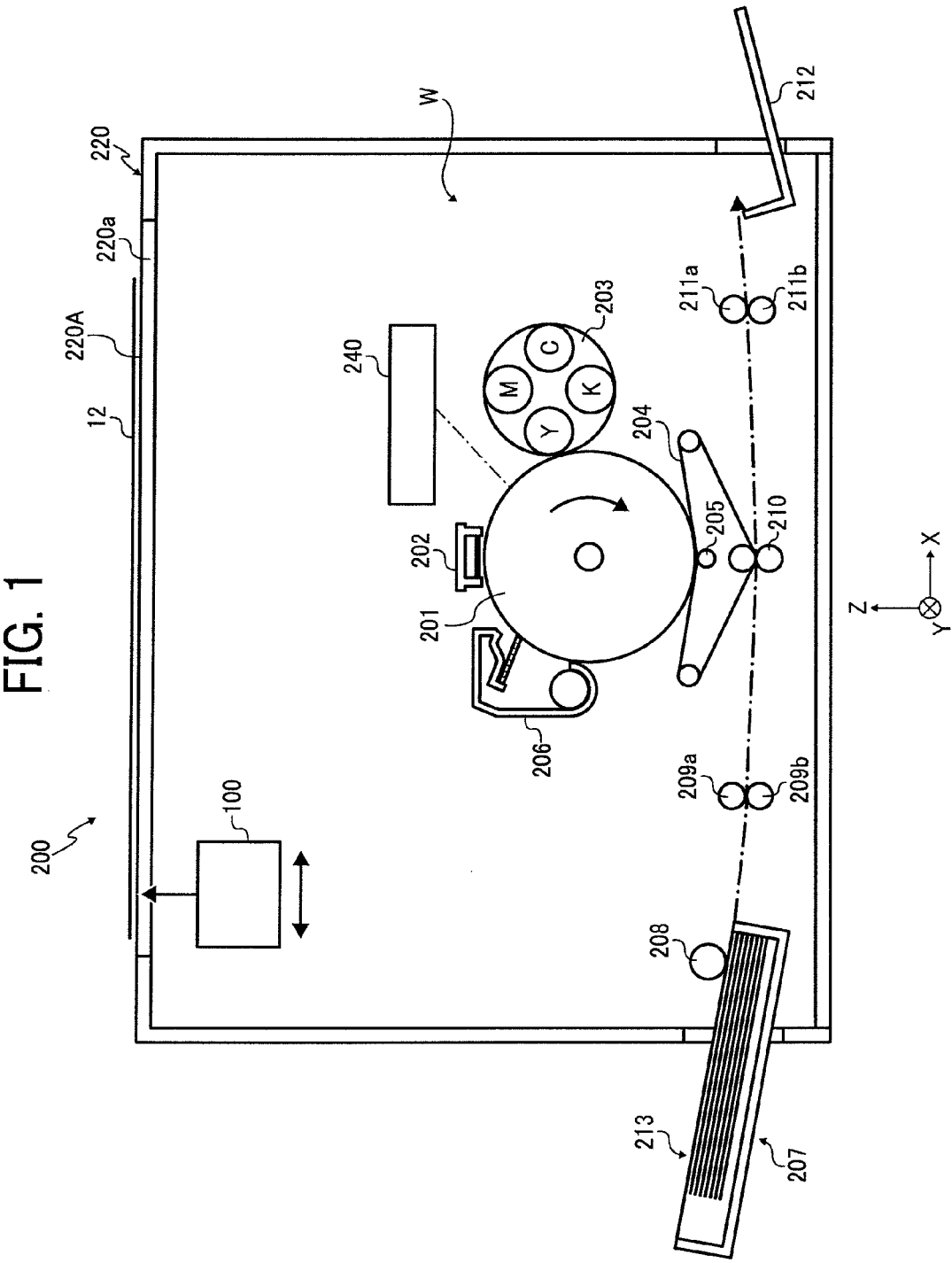
FIG. 1 is a diagram illustrating a schematic structure of an image forming apparatus according to an embodiment of the present invention.

In FIG. 1, a schematic structure of an image forming apparatus 200 according to the present invention is illustrated.

Figure 22:
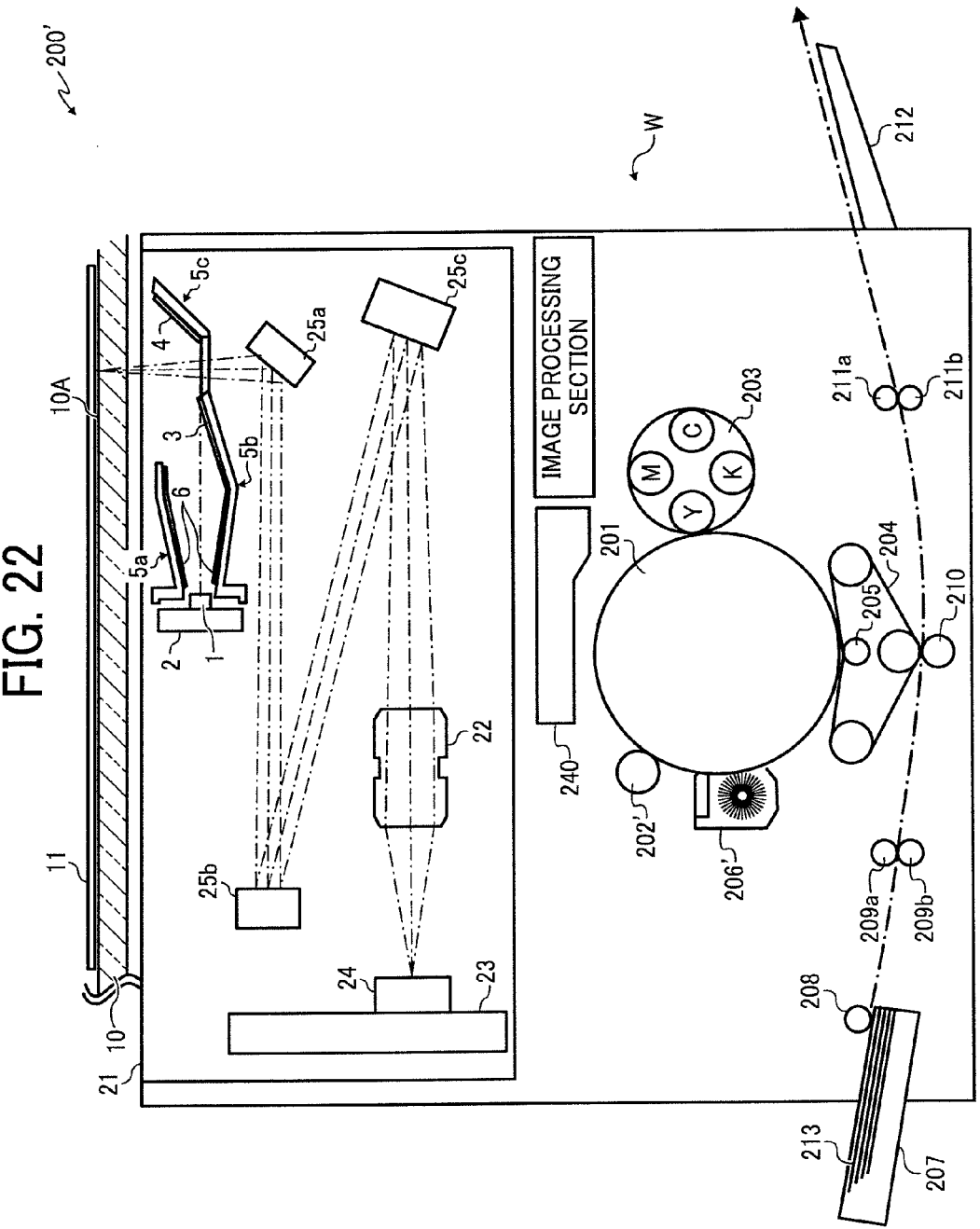
FIG. 22 is a schematic cross-sectional view of a structure of an embodiment in the image forming apparatus according to the present invention.

In addition, in FIG. 22, a schematic structure of an image forming apparatus 200' as a variant example according to embodiment 6 is illustrated.

This image forming apparatus 200 is a copier which reads image information written on a document 12 and transfers the image information on plain paper.

This image forming apparatus 200 has a housing 220, a reading unit 100, and a writing unit W.

The housing 220 is approximately in a rectangular parallelepiped shape, and in an upper part of the housing 220, a transparent contact glass 220a is provided.

The reading unit 100 is provided under the contact glass 220a, and is movable in an X axis direction illustrated in drawings by a driving mechanism which is not illustrated.

[Structure of Writing Unit of Embodiment 1]

The writing unit W has an optical scanning device 240, a photoconductor drum 201, an electrostatic charger 202, a developing device 203, a transfer belt 204, a transfer voltage applying roller 205, a cleaning device 206, a paper feeding cassette 207, a paper feeding roller 208, resist rollers 209a, 209b, a transfer roller 210, fuser rollers 211a, 211b, and a paper receiving tray 212.

[Structure of Reading Unit of Embodiment 1]

Figure 2:
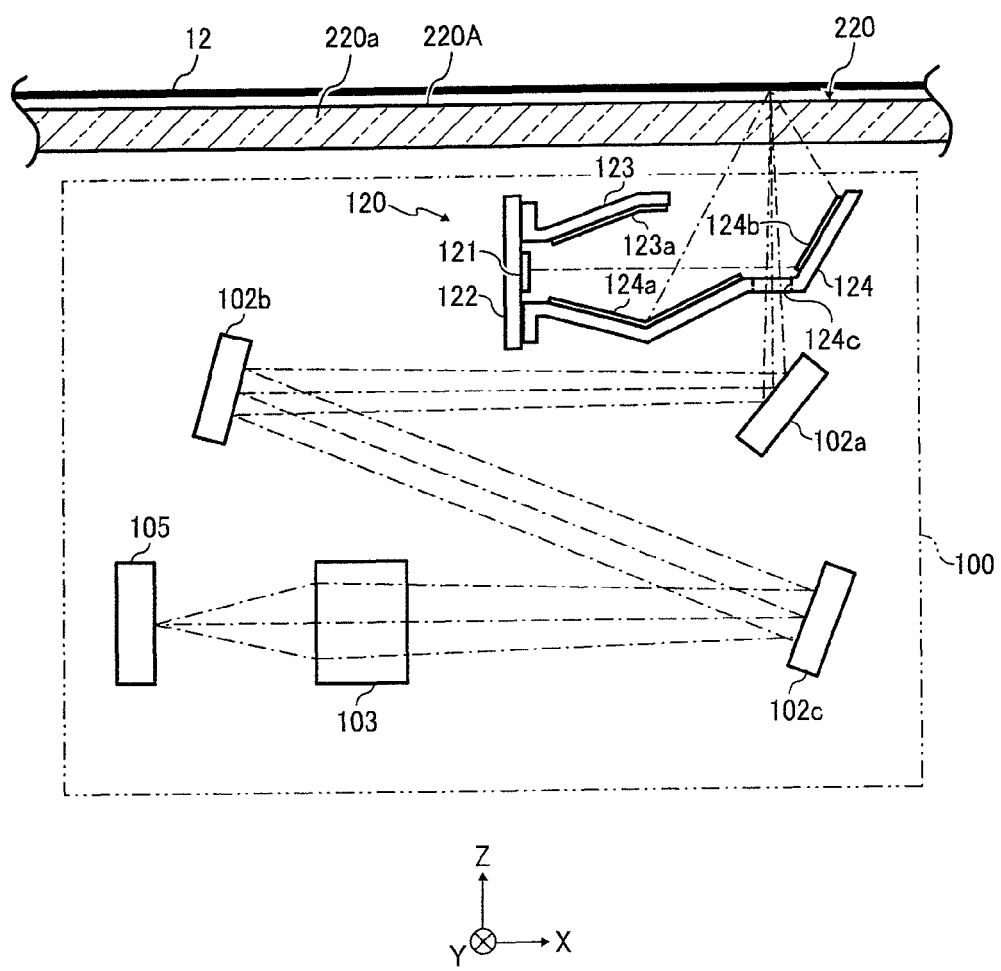
FIG. 2 is a diagram illustrating a schematic structure of a reading unit.

In FIG. 2, a schematic structure of the reading unit 100 is illustrated.

The reading unit 100 has a lighting unit 120, mirrors 102a, 102b, 102c, an imaging lens 103, and a line sensor 105.

The lighting unit 120 emits illumination light to light the document 12 placed on a document mounting surface 220A of the contact glass 220a.

The mirrors 102a, 102b, 102c reflect reflected light from the document 12 and lead to the line sensor 105.

The imaging lens 103 images the reflected light from the document 12 on the line sensor 105.

The line sensor 105 receives the reflected light from the document 12.

[Structure of Lighting Unit of Embodiment 1]

Figure 3:
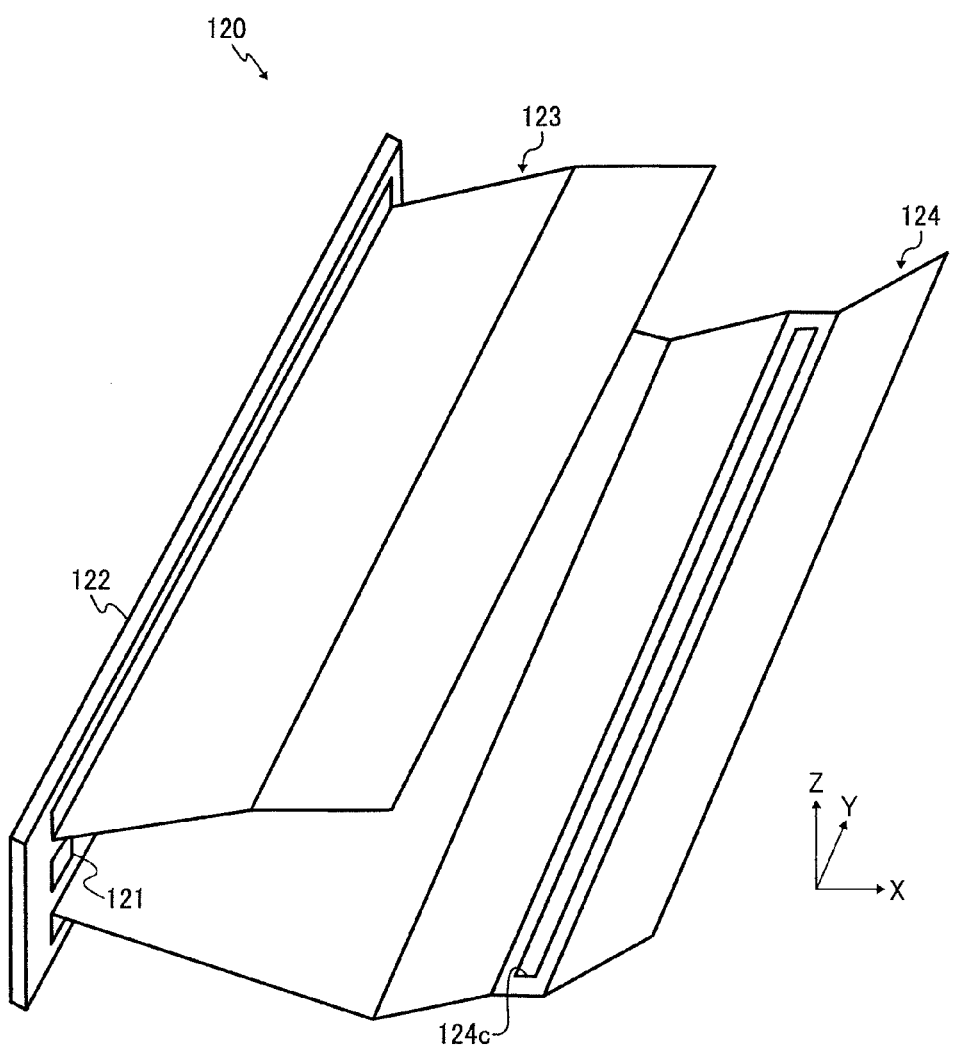
FIG. 3 is a perspective view of a lighting unit.

FIG. 3 is a perspective view of the lighting unit 120.

As illustrated in FIG. 3, the lighting unit 120 is structured by a long circuit board 122, a plurality of LEDs 121, a pair of reflecting sections 123, 124 in a folded-plate shape.

The LEDs 121 are arranged linearly on one surface of the circuit board 122 along a longitudinal direction of the circuit board 122.

A three-dimensional rectangular coordinate system is defined that a direction where the LEDs 121 are arranged is taken as a Y axis (a second axis) direction and a light-emitting optical axis of each of the LEDs 121 is taken as an X axis (a first axis) direction, and a vertical direction corresponds to a Z axis direction.

In a vertical position of the LEDs 121 arranged linearly, the pair of reflecting sections 123, 124 are fixed on the circuit board 122 in a state of facing reflecting surfaces each other.

Additionally as illustrated in FIG. 4, 12 LEDs are arranged such that adjacent intervals of the 12 LEDs become small toward a +Y direction and a -Y direction from a center of the circuit board 122.

That is, the LEDs 121 are arranged such that adjacent intervals of the LEDs 121 become gradually smaller toward both end parts from a central part of a part where the LEDs 121 linearly arranged.

A reflecting section 123, for example, is formed such that a rectangular-shaped plate member which is long in the Y axis direction is folded along the Y axis direction to be convex upward viewed from the Y axis direction.

And on a lower surface of the reflecting section 123, a reflecting surface 123a which reflects the illumination light is formed (see FIG. 2).

Additionally, the reflecting surface 123a may be formed by adhering a sheet having reflectivity on the lower surface of the reflecting section 123, or may be formed by vapor-depositing a metal or the like having reflectivity on the lower surface of the reflecting section 123.

A reflecting section 124 is formed such that a plate-shaped member where a rectangular-shaped opening 124c is formed is folded at both sides in a direction where this opening 124c extends. The above plate-shaped member is folded upward along an outer edge in a vicinity of a +X side of the opening 124c, and is folded downward along the outer edge in a vicinity of a -X side of the opening 124c, and a part folded downward is further folded to be convex downward.

And in the reflecting section 124, a reflecting surface 124a is formed on an upper surface side of a -X side part of the opening 124c, and a reflecting surface 124b is formed on an upper surface side of a +X side part of the opening 124c.

The reflecting surfaces 124a, 124b may be formed by adhering a sheet having reflectivity, or by vapor-depositing a metal or the like having reflectivity on an upper surface of the reflecting section 124.

FIG. 4 is a plain view of the circuit board 122.

As illustrated in FIG. 4, on a +X side surface of the circuit board 122, 12 LEDs 121 as a light source are arranged linearly.

In the present embodiment, the 12 LEDs are arranged along a longitudinal direction of the circuit board 122 such that adjacent intervals of the 12 LEDs become gradually smaller from the center of the circuit board 122 toward both sides in the longitudinal direction, and the light-emitting optical axis of each of the LEDs 121 faces a +X direction and is parallel to the X axis.

Figure 5:
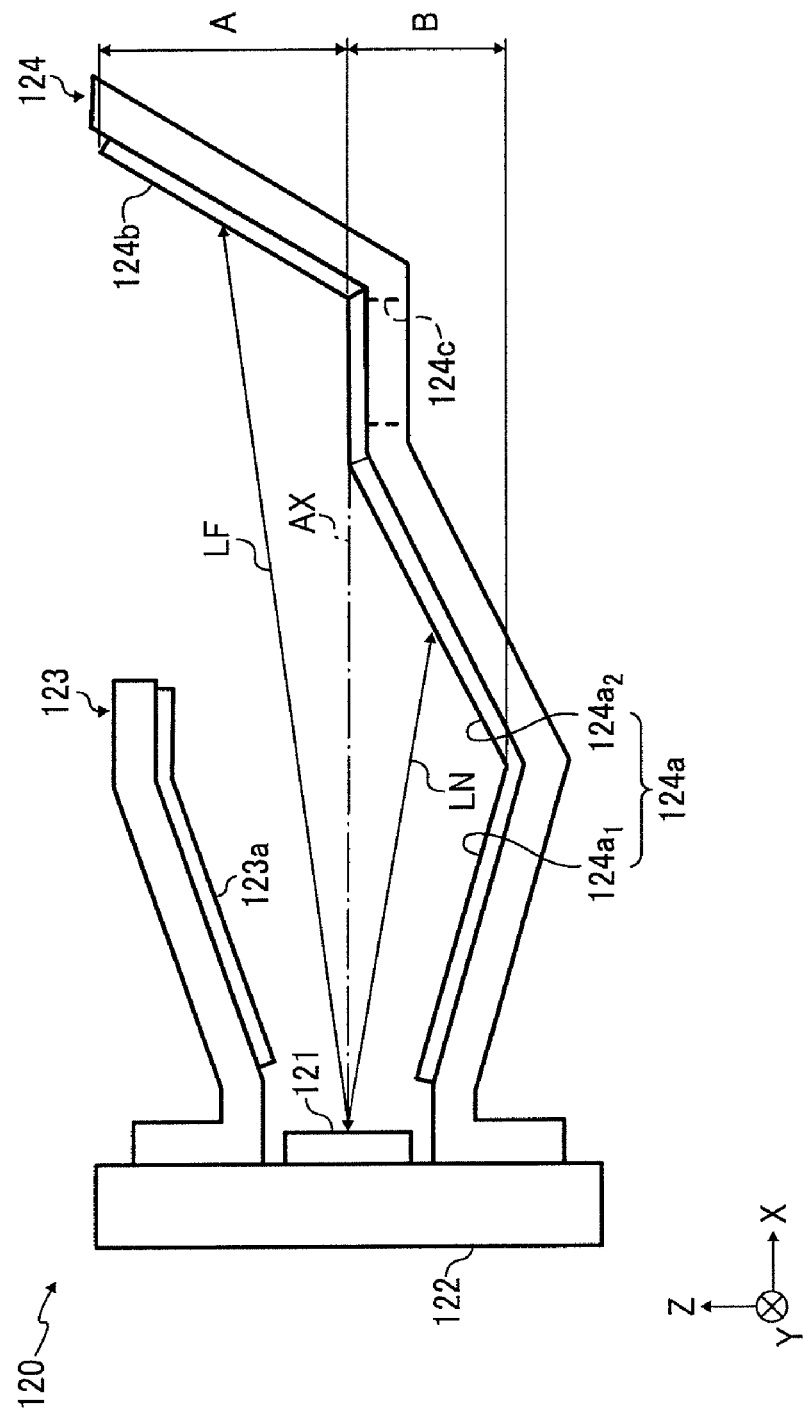
FIG. 5 is a side view of the lighting unit.

As illustrated in FIG. 5, in a state where the reflecting sections 123, 124 are assembled on the circuit board 122, the circuit board 122 is parallel to a YZ plane, and a part where the opening 124c of the reflecting section 124 is formed is approximately parallel to an XY plane.

And when a distance from the LEDs 121 provided on the circuit board 122 to a reflecting surface on a +X side (a reflecting surface 124a2) of the reflecting surface 124a comprising 2 reflecting surfaces is taken as a distance LN and a distance from the LEDs 121 provided on the circuit board 122 to the reflecting surface 124b is taken as a distance LF, a projected area (orthogonal projected area) A onto a plane (YZ plane) perpendicular to an X axis direction (a first axis direction) of an irradiation area of irradiation light on the reflecting surface 124b is larger than a projected area (orthogonal projected area) B onto the plane (YZ plane) perpendicular to the X axis direction (the first axis direction) of an irradiation area of irradiation light on the reflecting surface 124a2.

In particular, in the present embodiment, a ratio of the projected area B onto the YZ plane of the reflecting surface 124a2 to the square of the distance LN and a ratio of the projected area A onto the YZ plane of the reflecting surface 124b to the square of the distance LF are approximately equal.

Hereinafter, as illustrated in FIG. 5, the reflecting surface 124a includes 2 reflecting surfaces, and a reflecting surface on a -X side is illustrated as a reflecting surface 124a1 and a reflecting surface on a +X side is illustrated as a reflecting surface 124a2.

[Function of the Lighting Unit of Embodiment 1]

As illustrated in FIG. 2, in the lighting unit 120 structured as described above, illumination light emitted in the +X direction from the LEDs 121 of the lighting unit 120 is incident on the reflecting surface 124b and the reflecting surface 124a2 so that the illumination light is reflected in a +Z direction and is incident on a lower surface of the document 12.

And the illumination light incident on the lower surface of the document 12 is reflected in a -Z direction and a part of the light proceeds in the -Z direction via the opening 124c formed in the reflecting section 124.

This illumination light is reflected by the mirrors 102a, 102b, 102c in turn, and is incident on the imaging lens 103, and is imaged on a light receiving-surface provided on a +X side of the line sensor 105 by the imaging lens 103.

[Function of the Reading Unit of Embodiment 1]

The line sensor 105, for example, is a 3-line CCD having a photoelectric conversion element including red, green and blue filters, and generates an image signal according to the intensity of the reflected light imaged on the receiving surface, and then outputs.

This image signal is processed by an image processing circuit, which is not illustrated, and is outputted as a write signal for the optical scanning device 240.

[Function of the Optical Scanning Device of Embodiment 1]

The optical scanning device 240 illustrated in FIG. 1 modulates the intensity of a laser beam irradiating the photoconductor drum 201 based on the write signal from the image processing circuit, and an irradiation direction of the laser beam is scanned in a main scanning direction (the Y axis direction in FIG. 1), and thereby an electrostatic latent image is formed on a surface of the photoconductor drum 201.

[Structure of the Writing Unit of Embodiment 1]

The photoconductor drum 201 is a member having a cylindrical shape, and on a surface of the photoconductor drum 201, a photoconductive layer, which becomes electrically conductive when the surface is exposed to a laser beam, is formed.

The photoconductor drum 201 is placed under the optical scanning device 204 as a Y axis direction is taken as an axis direction of the photoconductor drum 201, and rotates in a clockwise direction in FIG. 1 (the direction illustrated by an arrow in FIG. 1) by a rotating mechanism, which is not illustrated.

And around the photoconductor drum 201, at a 12 o'clock (upper side) position in FIG. 1, the electrostatic charger 202 is placed, at a 2 o'clock position, the developing device 203 is placed, at a 6 o'clock position, the transfer belt 204, the transfer voltage applying roller 205 and so on are placed, and at a 10 o'clock position, the cleaning device 206 is placed.

The electrostatic charger 202 is placed via a predetermined clearance with respect to the surface of the photoconductor drum 201 and charges the surface of the photoconductor drum 201 with a predetermined voltage.

As an electrostatic charger, an electrostatic charging roller 202' illustrated in FIG. 22 is also used instead of a so-called "corona charger" like the electrostatic charger 202.

The developing device 203 is a revolver-type developing device, and applies yellow, magenta, cyan and black toners on the surface of the photoconductor drum 201 in turn.

The cleaning device 206 is provided with a rectangular-shaped cleaning blade which extends along the axis direction of the photoconductor drum 201, and is placed such that the longer one end of the cleaning blade makes contact with the surface of the photoconductor drum 201.

Toners adhered on the surface of the photoconductor drum 201 are wiped by the cleaning blade with a rotation of the photoconductor drum 201, and collected in the cleaning device 206.

As a cleaner, a cleaning device 206' having a cleaning brush illustrated in FIG. 22 is also used instead of the cleaning device 206 having the cleaning blade.

The transfer belt 204 is an annular belt stretched around 3 rollers, and a voltage of a reverse polarity to the electrostatic charger 202 is applied on an upper surface of the transfer belt 204 and the upper surface is pressed on the photoconductor drum 201 by the transfer voltage applying roller 205.

The paper feeding cassette 207 is attached in a state where a −X side end is projected from an opening formed in a side wall of a −X side of the housing 220 and stores a plurality of sheets of paper 213 in the paper feeding cassette 207.

The paper feeding roller 208 sends out the paper 213 per sheet from the paper feeding cassette 207, and a sheet of the sent out paper 213 is sent to between the transfer belt 204 and the transfer roller 210 by the resist rollers 209a, 209b comprising a pair of rotating rollers.

The voltage of the reverse polarity to the transfer voltage applying roller 205 is applied on the transfer roller 210, and the upper surface of the transfer roller 210 is pressed on the transfer belt 204.

The fuser rollers 211a, 211b comprising a pair of rotating rollers heat and press the paper 213.

And the paper 213 is discharged in turn to the paper receiving tray 212 placed in a state where a +X side end is projected from an opening formed in a side wall of a +X side of the housing 220.

[Function of the Image Forming Apparatus of Embodiment 1]

Next, the movement of the image forming apparatus 200 structured as described above will be explained.

When image information of the document 12 is obtained by the movement of the reading unit 100 in an X axis direction, the optical scanning device 240 is driven based on a write signal on the basis of this image information, and the surface of the photoconductor drum 201 is scanned by a laser beam.

A photoconductive layer of the surface of the photoconductor drum 201 is electrically charged at the predetermined voltage by the electrostatic charger 202, therefore an electric charge is distributed at a certain electric charge density.

When the surface of the photoconductor drum 201 is scanned by the laser beam, a part of the photoconductive layer exposed to the laser beam has an electrical conductivity, and the electric charge is discharged by a flow of an electric current, and accordingly an electric potential of the part becomes zero (0).

Therefore, the photoconductor drum 201 which rotates in an arrow direction in FIG. 1 is scanned by the laser beam modulated based on the image information, and thereby an electrostatic latent image defined by a distribution of the electric charge is formed on the surface.

The formed electrostatic latent image is a so-called "negative latent image", and a part where an image is formed (toners remain) is exposed.

When the electrostatic latent image is formed on the surface of the photoconductor drum 201, a toner corresponding to each color is supplied in turn on the surface of the photoconductor drum 201 by the developing device 203.

On the surface of the photoconductor drum 201, the toner adheres to only the scanned part, therefore the electrostatic latent image is visualized by the toner corresponding to each color and the toner images corresponding to each color are formed in turn.

Specifically, with a rotation of the photoconductor drum 201, a yellow image, a magenta image, a cyan image and a black image are formed in turn. Reversal developments are performed on formed electrostatic latent images by each of developing units Y (performing a development by a yellow toner), M (performing a development by a magenta toner), C (performing a development by a cyan toner) and K (performing a development by a black toner) of the revolver-type developing device 203 in turn, and the formed electrostatic latent images are visualized as positive images. Then each color toner image (positive image) is transferred on the transfer belt 204 by the transfer voltage applying roller 205 in turn, and each color image is combined on the transfer belt 204, and a full-color toner image is generated.

In the image forming apparatus according to the present embodiment, not only the above revolver-type developing device 203 but also a known developing device as a tandem-type developing device or the like may be applied.

Every time each color toner image is transferred, the surface of the photoconductor drum 201 is cleaned by the cleaning device 206, and excess toners, paper fibers, and the like are removed.

After, the toner image comprising each color toner is adhered on the paper 213 which is sent to between the transfer belt 204 and the transfer roller 210 by a function of the transfer roller 210, and is fused by the fuser rollers 211a, 211b.

Accordingly, an image corresponding to the image on the document 12 is formed on the paper 213.

Thus the paper 213 where the image is formed is stacked in the paper receiving tray 212 in turn.

A structure of the image forming apparatus can be changed to a known structure for forming a single color image.

The image forming apparatus according to the present embodiment is not limited to the above illustrated various limitations, and known structures of image forming apparatuses are applicable without departing from the scope of the effect of the present embodiment.

[Function and Effect of Embodiment 1]

As explained above, in the present embodiment, the projected area (orthogonal projected area) A in the plane (YZ plane) perpendicular to the X axis direction (the first axis direction) of an irradiation area of irradiation light on the reflecting surface 124b is larger than the projected area (orthogonal projected area) B in the plane (YZ plane) perpendicular to the X axis direction (the first axis direction) of an irradiation area of irradiation light on the reflecting surface 124a2.

Accordingly, in a case of lighting a document, it is possible to approximately equalize the light amount of one side and the other side of incident positions of a principal ray of incident illumination light on the document, and thereby it is possible to illuminate the document accurately and evenly.

Particularly, the ratio of the projected area B in the YZ plane of the reflecting surface 124a2 to the square of the distance LN, and the ratio of the projected area A in the YZ plane of the reflecting surface 124b to the square of the distance LF become approximately equal.

Figure 6A:
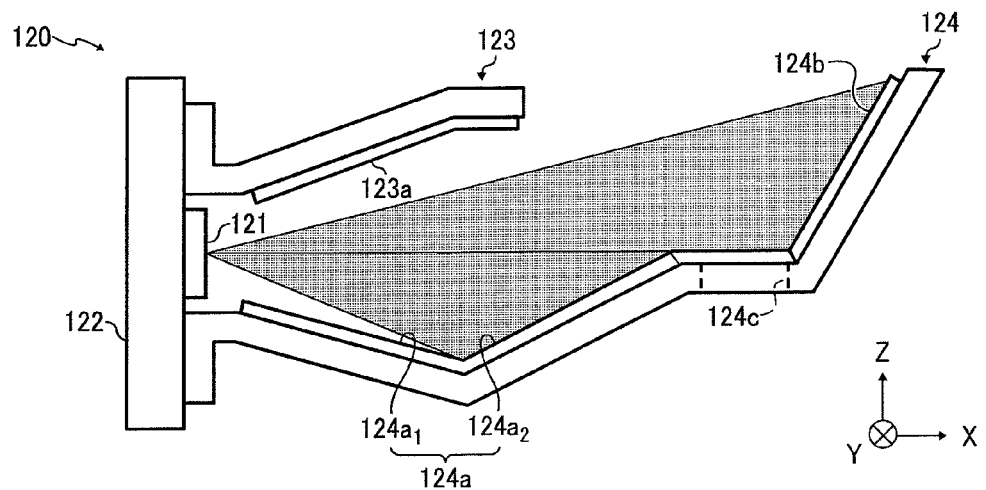
FIG. 6A is a diagram explaining a function of the lighting unit.

Accordingly, as illustrated in FIG. 6A, a light amount of illumination light which is incident on the reflecting surface 124b emitted from the LEDs 121 and a light amount of illumination light which is incident on the reflecting surface 124a2 become equal.

Therefore, a light amount of illumination light which is incident obliquely from a +X side and a light amount of illumination light which is incident obliquely from a −X side to the image reading area of the document 12 become approximately equal, and thereby it is possible to illuminate the document 12 evenly.

In particular, for example, even in a case where a cut-and-paste document is placed on a document mounting surface 220A of the contact glass 220a, a boundary of the original document and another document is illuminated from both sides evenly, therefore it is possible to avoid noise by the boundary of the cut-and-paste document or the like being formed on the paper 213.

Figure 6B:
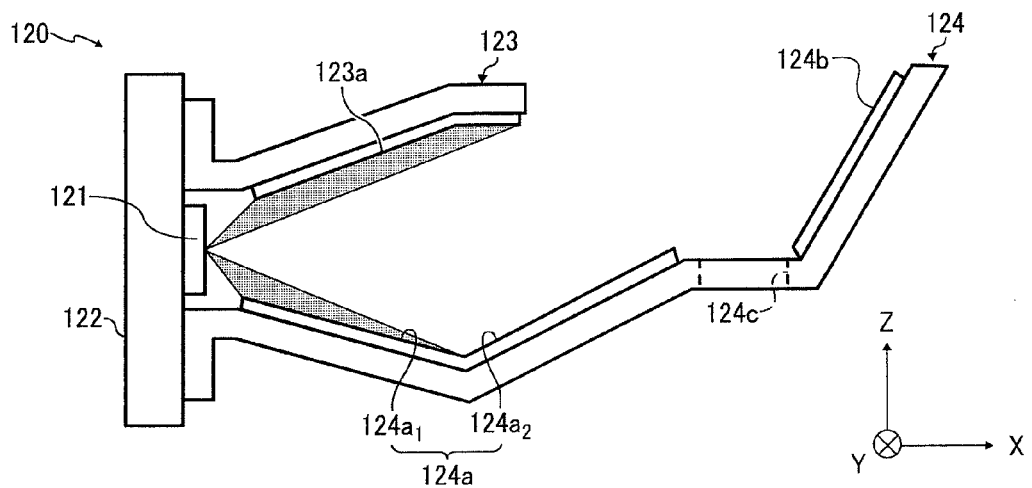
FIG. 6B is a diagram explaining a function of the lighting unit.

Additionally, in the present embodiment, as illustrated in FIG. 6B, at least a part of the incident illumination light on the reflecting surface 123 and on the reflecting surface 124a1 emitted from the LEDs 121 is incident on the reflecting surface 124b or on the reflecting surface 124a2.

Therefore, illumination light other than the illumination light which is directly incident on the reflecting surface 124b and on the reflecting surface 124a2 is used as illumination light for the document 12.

In addition, in the present embodiment, a plurality of LEDs 121 are arranged such that adjacent intervals of each of the LEDs 121 become gradually smaller toward both end parts from a central part of a part where the LEDs 121 are linearly arranged, therefore it is possible to compensate for a decrease in a peripheral light amount which occurs according to an angle of view of an image reading lens provided with the reading unit.

That is, it is possible to compensate for the cosine fourth law of the angle of view of the image reading lens properly, and to illuminate favorably.

Additionally, the image forming apparatus of the present embodiment is provided with the lighting unit of the present embodiment, therefore it is possible to illuminate the document accurately and evenly, and as a result it is possible to read the document accurately.

And a deterioration of an image quality by shadowing occurring on the cut-and-paste document or at an edge of the document is prevented, and the image is read favorably, and furthermore it is possible to achieve a small-sized image forming apparatus with a low power consumption.

[Variation Example of Embodiment 1]

Figure 7:
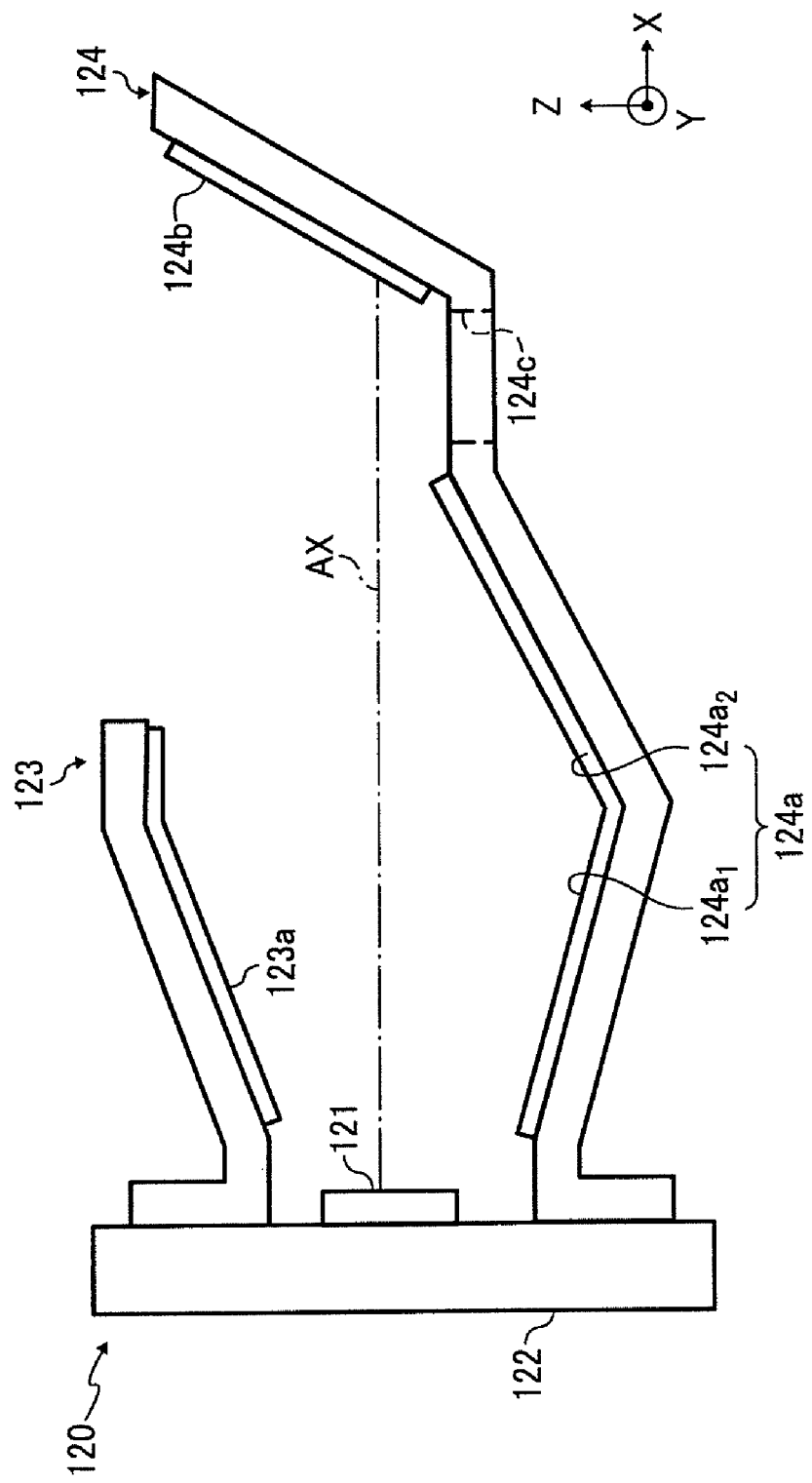
FIG. 7 is a diagram (1) illustrating a variant example of the lighting unit.

In the present embodiment, as illustrated in FIG. 5, an LED 121 and the reflecting sections 123, 124 are placed in a relationship such that an axis AX which is parallel to an X axis passing through a center of the LED 121 passes a vicinity of a boundary of the reflecting surface 124b and the reflecting surface 124a2, however, as illustrated in FIG. 7 as an example, the LED 121 and the reflecting sections 123, 124 may be placed such that the axis AX intersects the reflecting surface 124b.

That is, the axis AX may be placed to intersect either the reflecting surface 124a2 or the reflecting surface 124b.

Therefore, a principal ray of each LED 121 where the intensity is the highest is incident on the reflecting surface 124b, and as a result, this makes it easy to adjust the equalization of a light amount of incident illumination light on the reflecting surface 124b and a light amount of incident illumination light on the reflecting surface 124a1

Figure 8A:
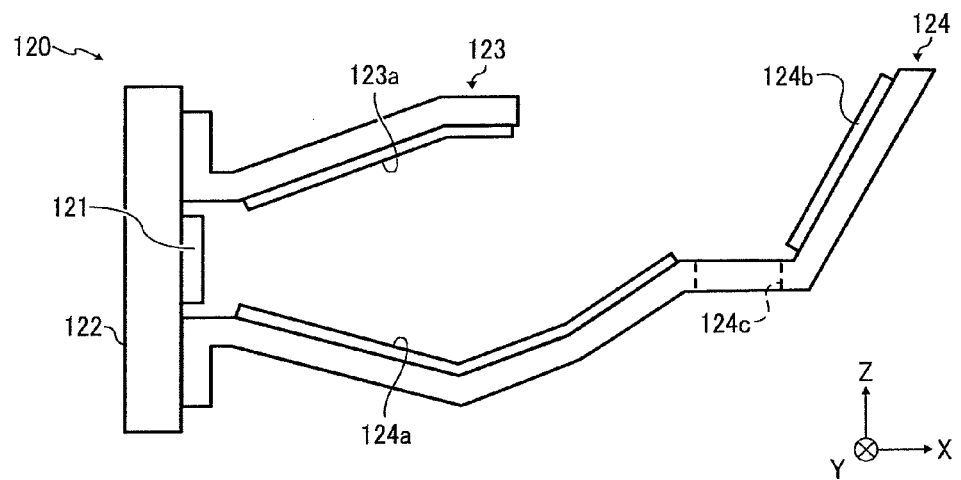
FIG. 8A is a diagram (2) illustrating a variant example of the lighting unit.

And as illustrated in FIG. 8A, as an example, the reflecting surface 124a may be structured of 3 flat surface parts.

Figure 8B:
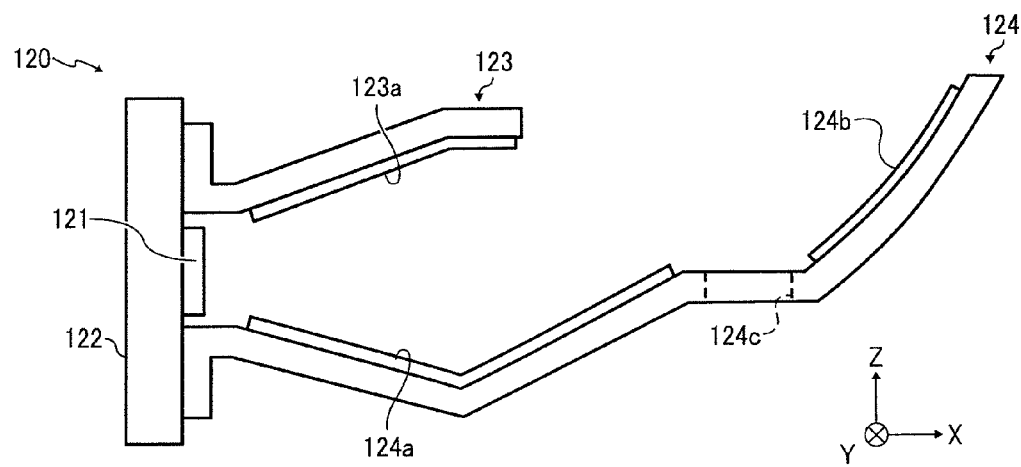
FIG. 8B is a diagram (3) illustrating a variant example of the lighting unit.

In addition, as illustrated in FIG. 8B, the reflecting surface 124b may be a curved surface having a generatrix in a Y axis direction.

In a case where a reflecting surface is structured by a plurality of parts, it is possible to adjust an incident range of the illumination light to a document.

Additionally, by using a curved surface for a reflecting surface, the illumination light is collected effectively.

Additionally, as for the LED 121, it is preferable to use the illumination light effectively by using the LED 121, where a half-value angle of the light intensity is less than or equal to 60 degrees.

As for the distance from the LED 121 to each reflecting surface, the distance may be set to be a distance where any unevenness of the illumination light which occurs on the document is reduced.

This distance is set appropriately depending on the number of the LEDs 121 provided on the circuit board 122.

In addition, in the present embodiment, as illustrated in FIG. 4, 12 LEDs are arranged such that adjacent intervals of the 12 LEDs become gradually smaller from a center of the circuit board 122 toward a +Y direction and toward a −Y direction.

Generally, compared to light passing through a center of a collecting lens, the light amount of a light passing through a circumference side of the collecting lens is decreased, however by use of the above structure, the light amount passing through the circumference side of the collecting lens is increased. Therefore, it is possible to avoid a decrease in the peripheral light amount by the collecting lens, and the line sensor is capable of reading of information.

As for the LEDs 121, the use of both a surface-emitting type and an edge-emitting type is considered, however the present embodiment is suitable for a case where a light source other than an LED is used for lighting a document.

Additionally, in the present embodiment, a case where the lighting unit 120 of the present embodiment is used for a copier has been explained, however the lighting unit 120 is suitable for an image forming apparatus other than the copier, for example, a facsimile, or a machine performing multiple functions such as the above functions.

Embodiment 2

Hereinafter, referring to drawings, detailed structures of a lighting unit according to embodiment 2 will be explained specifically.

[Structure of the Lighting Unit of Embodiment 2]

Figure 10:
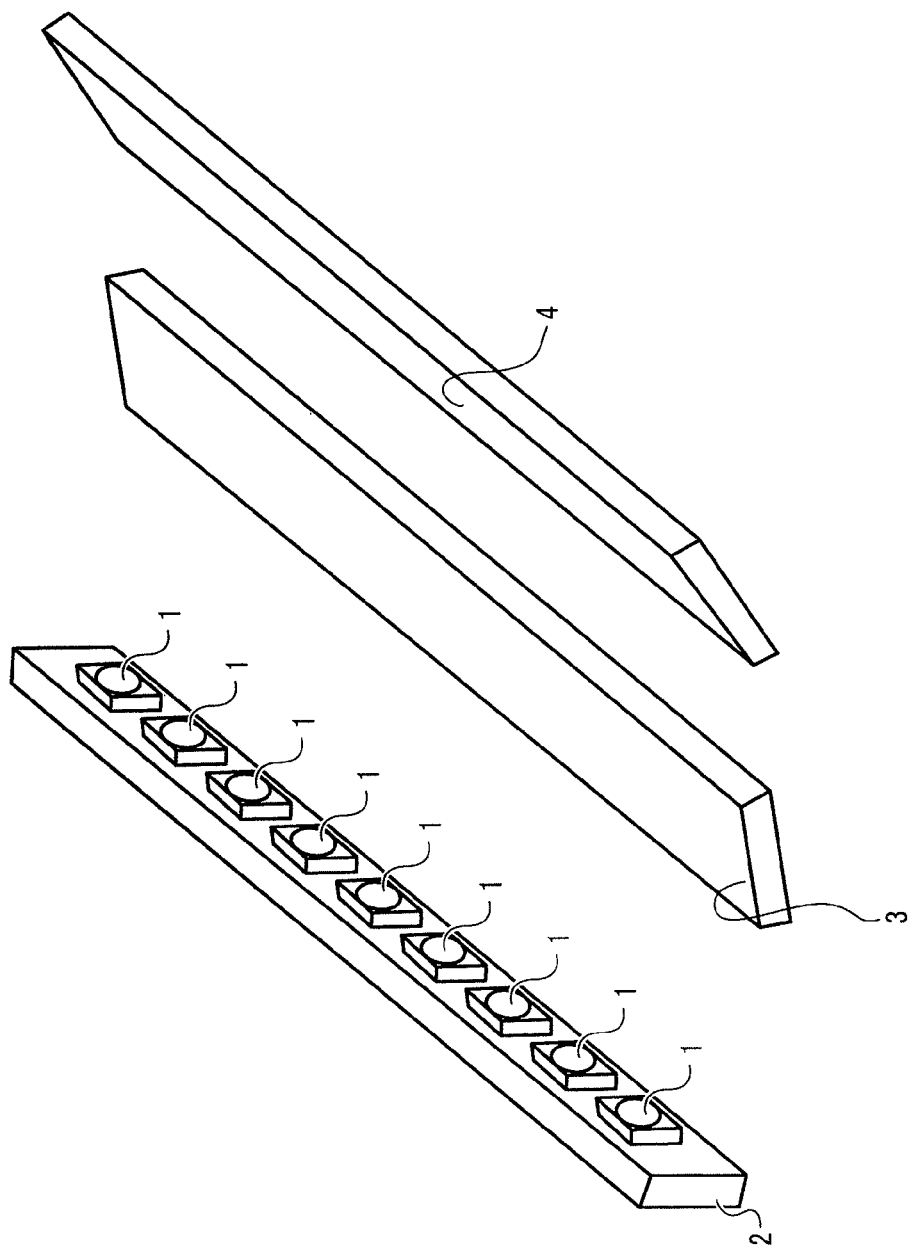
FIG. 10 is an enlarged view illustrating a structure of a light source and a reflecting surface in FIG. 9.

FIG. 9 is a schematic view illustrating a structure of the lighting unit of the embodiment 2. FIG. 10 is an enlarged view illustrating a structure of a light source and reflecting surfaces in FIG. 9.

In FIG. 9, a document 11 and a contact glass 10 made of a transparent material are illustrated as an explanation, however they are not included in the lighting unit according to the present embodiment.

[Structure of the Light Source Section of the Lighting Unit]

A light source section is structured by a plurality of surface-emitting type LEDs 1 as a light source having a high directional characteristic in a light-emitting optical axis direction which are arranged linearly on a circuit board 2.

Figure 11:
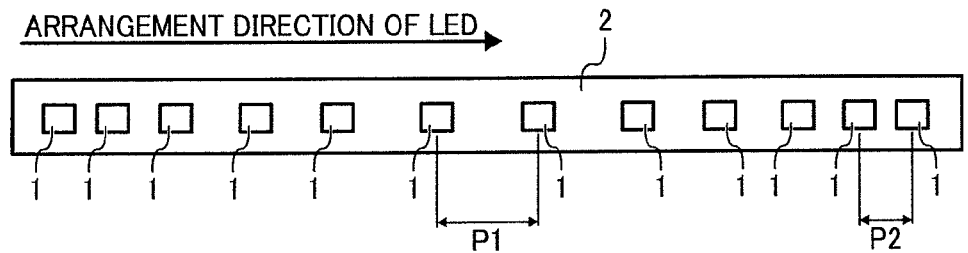
FIG. 11 is a schematic diagram illustrating an arrangement structure of a light source which is applicable to the lighting unit of embodiment 2 according to the present invention.

The LEDs 1 are arranged at predetermined intervals. Even in a case where the LEDs 1 are arranged at regular intervals, intervals of an arrangement of the LEDs 1 may be denser in peripheral parts than in a center of the circuit board 22 to compensate for a decrease in a peripheral light amount occurring due to the cosine fourth law of the angle of view of the image reading lens as illustrated in FIG. 11.

As the light source of the present embodiment, it is preferable to use an LED having the highest light-emitting intensity in a normal direction from a light-emitting surface.

That is, as the light source of the present embodiment, it is preferable to use an LED which emits light in which the light-emitting intensity is the highest in its light-emitting optical axis direction (a first axis direction).

[Structure of the Reflecting Section and the Opening Section of Lighting Unit]

The light emitted from the light source section is reflected respectively to illuminate a document surface by 2 reflecting surfaces 3, 4 comprising a reflecting section placed before an emitting direction of the light source section.

The reflected light from the document surface passes through an opening section 7 (an opening or a space where the reflected light from the document passes through, and it does not indicate a specific member) between the reflecting surfaces 3, 4, and is guided to a photoelectric conversion element which is not illustrated.

Here, with respect to the light source section, a reflecting surface placed closer to the light source section than to an irradiated area of the document surface is taken as a first reflecting surface 3, and a reflecting surface placed more distant from the light source section than from the irradiated area is taken as a second reflecting surface 4.

Refractive indexes and extinction coefficients of materials of the reflecting surfaces 3, 4 are different in a visible light region. Refractive indexes n, extension coefficients k, and a ratio k/n in a range of wavelengths of the visible light of aluminum, silver, rhodium, and magnesium, as specific examples of the materials used for the reflecting surfaces, are expressed in Tables 1 to 4.

TABLE 1

| Aluminum | | | |
|---|---|---|---|
| | Refractive index n | Extension coefficient k | k/n |
| 427.5 nm | 0.558 | 5.2 | 9.3 |
| 442.8 nm | 0.598 | 5.38 | 9.0 |
| 500.0 nm | 0.769 | 6.08 | 7.9 |
| 600.0 nm | 1.2 | 7.26 | 6.1 |
| 700.0 nm | 1.83 | 8.31 | 4.5 |

TABLE 2

| Silver | | | |
|---|---|---|---|
| | Refractive index n | Extension coefficient k | k/n |
| 427.5 nm | 0.16 | 2.26 | 14.1 |
| 442.8 nm | 0.157 | 2.4 | 15.3 |
| 495.9 nm | 0.13 | 2.88 | 22.2 |
| 590.4 nm | 0.121 | 3.66 | 30.2 |
| 688.8 nm | 0.14 | 4.15 | 29.6 |

TABLE 3

| Rhodium | | | |
|---|---|---|---|
| | Refractive index n | Extension coefficient k | k/n |
| 427.5 nm | 1.63 | 4.36 | 2.7 |
| 442.8 nm | 1.8 | 4.49 | 2.5 |
| 495.9 nm | 1.88 | 4.65 | 2.5 |
| 590.4 nm | 2.05 | 5.3 | 2.6 |
| 688.8 nm | 2.3 | 6.02 | 2.6 |

TABLE 4

| Magnesium | | | |
|---|---|---|---|
| | Refractive index n | Extension coefficient k | k/n |
| 413.0 nm | 0.184 | 3.66 | 19.9 |
| — | — | — | — |
| — | — | — | — |
| 620.0 nm | 0.382 | 5.74 | 15.0 |
| (827.0 nm) | (0.791) | (7.96) | (10.1) |

Figure 12:
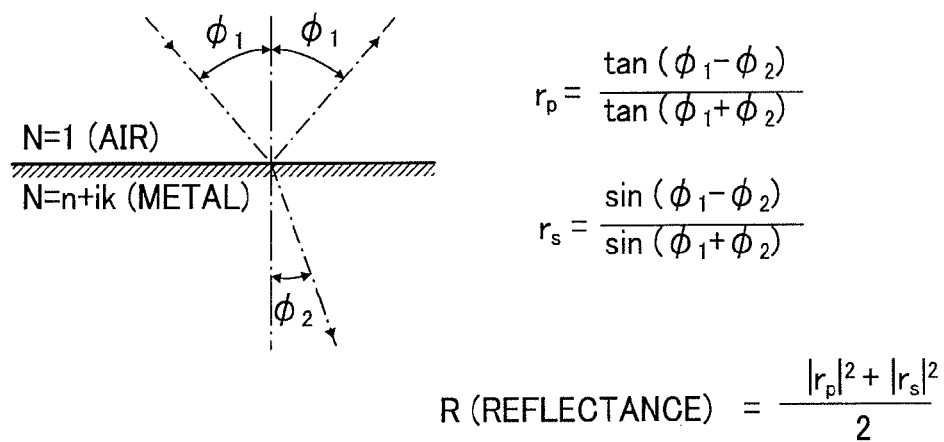
FIG. 12 is a explanatory diagram explaining a reflectance on a surface of a material.
Figure 13:
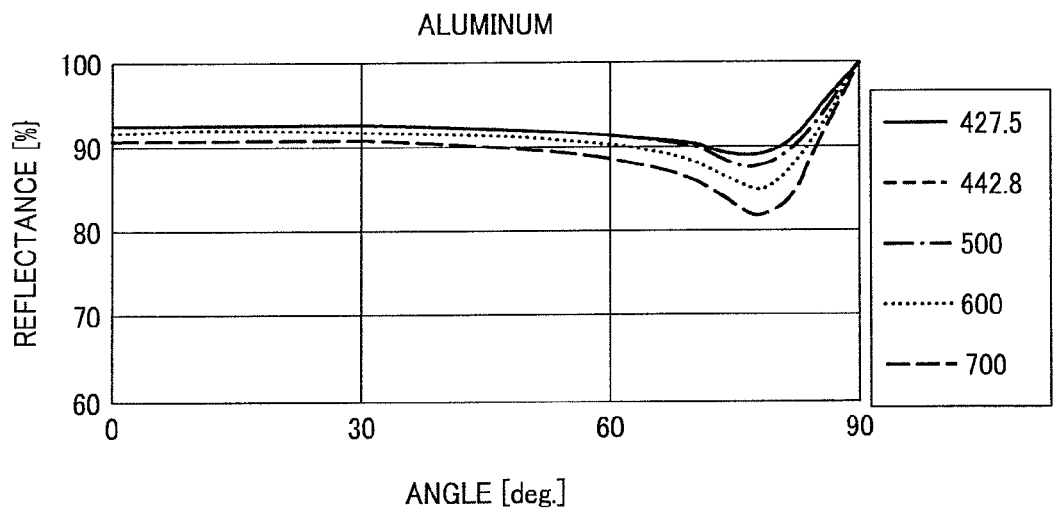
FIG. 13 is a graph illustrating a relationship between an incident angle and a reflectance on a surface of aluminum.
Figure 14:
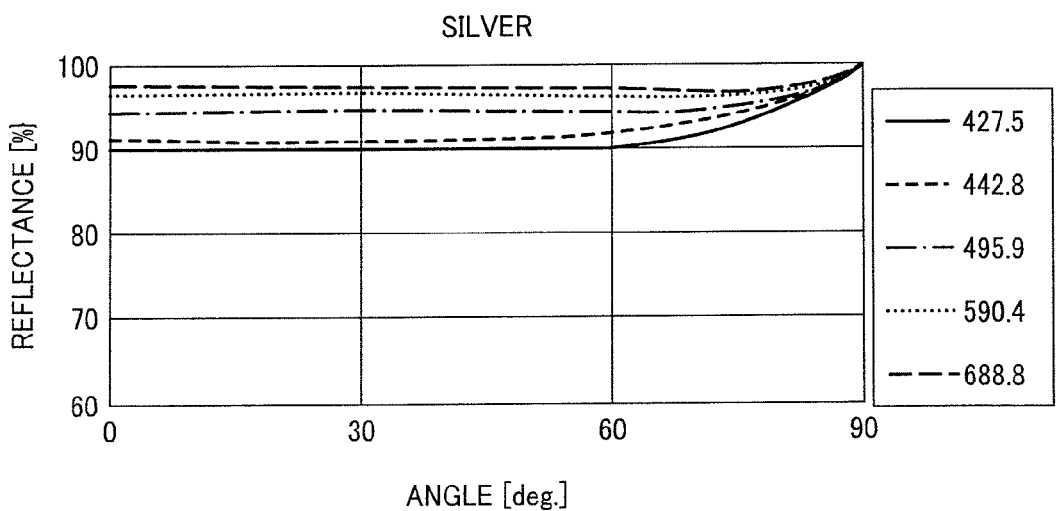
FIG. 14 is a graph illustrating a relationship between an incident angle and a reflectance on a surface of silver.
Figure 15:
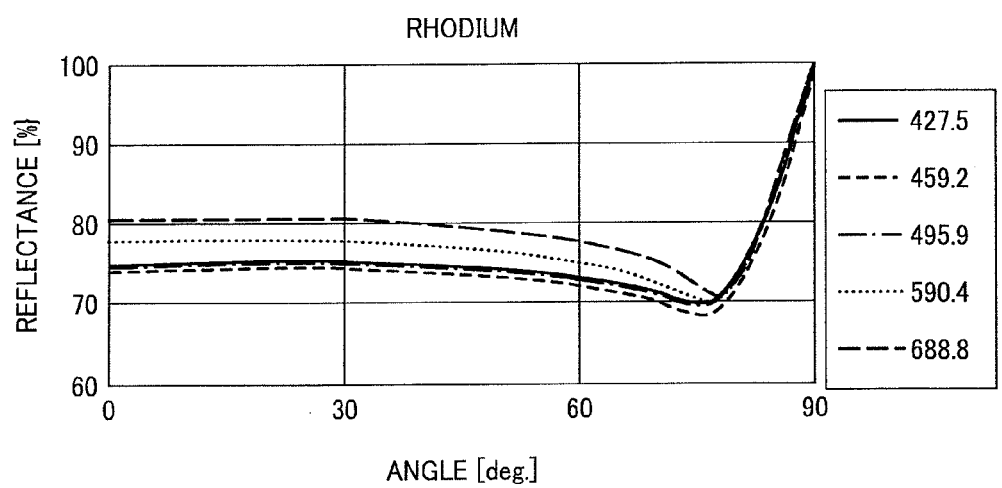
FIG. 15 is a graph illustrating a relationship between an incident angle and a reflectance on a surface of rhodium.
Figure 16:
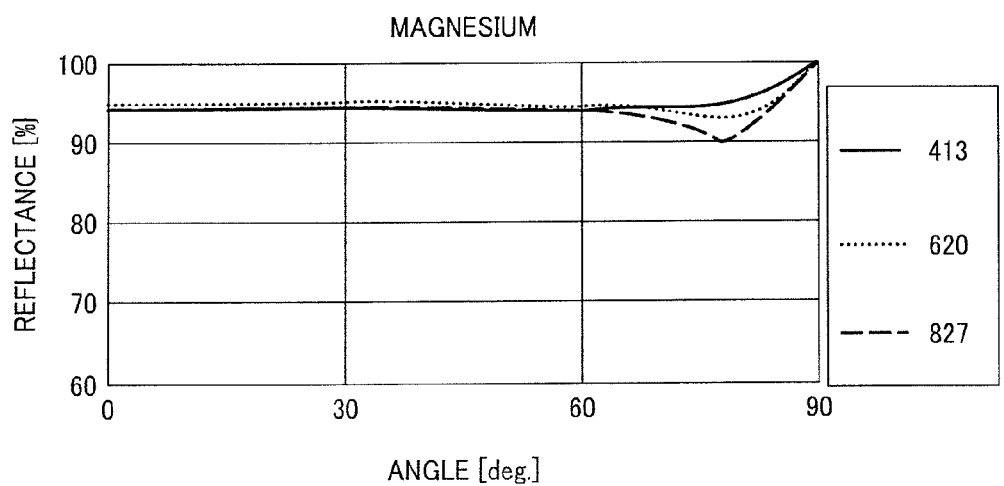
FIG. 16 is a graph illustrating a relationship between an incident angle and a reflectance on a surface of magnesium.

As illustrated in FIG. 12, the light reflectance in a case where a part of incident light is reflected on an interface where different materials contact with each other is obtained by Fresnel equations.

When air is taken as a material in a side of incident light, and a reflectance on the reflecting surface is calculated per angle by use of refractive indexes and extension coefficients in Tables 1 to 4, results are illustrated in FIGS. 13, 14, 15, and 16.

Here, the ratio k/n of magnesium is the largest around 430 nm, and as a result the reflectance is also the highest.

On the other hand, the ratio k/n of rhodium is the smallest, and the reflectance is the lowest.

In the lighting unit according to the present embodiment, a ratio of an extension coefficient to a refractive index of the second reflecting surface is larger than a ratio of an extension coefficient to a refractive index of the first reflecting surface, with respect to light in a visible light region.

Therefore, for example, rhodium, which is a material having a small ratio (k/n) of an extension coefficient to a refractive index, is placed in the reflecting surface close to the light source section and magnesium, which is a material having a large ratio (k/n) of an extension coefficient to a refractive index, is placed in the reflecting surface distant from the light source section.

[Function and Effect of the Lighting Unit of Embodiment 2]

In the lighting unit according to the present embodiment, the ratio of the extension coefficient to the refractive index of the second reflecting surface is larger than the ratio of the extension coefficient to the refractive index of the first reflecting surface, with respect to light in the visible light region. Therefore, the reflectance of the reflecting surface distant from the light source section is capable of becoming larger than the reflectance of the reflecting surface close to the light source section, and thereby it is possible for illumination light distant from the light source section to become lighter, and it is possible for the light amount of the illumination light from both sides to be equalized favorably.

In addition, by use of an LED that such the light-emitting intensity in the normal direction of the light-emitting surface is the highest, the emitted light from the LED is able to favorably irradiate two reflecting surfaces spaced out in the normal direction of the light-emitting surface of the LED.

And it is possible to irradiate light in an angular range such that the light-emitting intensity is the highest of emitted light from a light-emitting element to a reflecting surface.

Additionally, even if a light-conductive member in which a different member is interposed between the light source section and the reflecting surface or the like is used, the light in the angular range that light-emitting intensity is the highest is not reflected by the above different member, therefore an influence to the illumination light by this different member is decreased.

That is, an attenuation of the light in the angular range that a light-emitting intensity is the highest is decreased, and thereby usage efficiency of light becomes high, and electric power saving is effectively achieved.

And regardless of the number of the LEDs, a small lighting unit without any unevenness of light is achieved.

Figure 17:
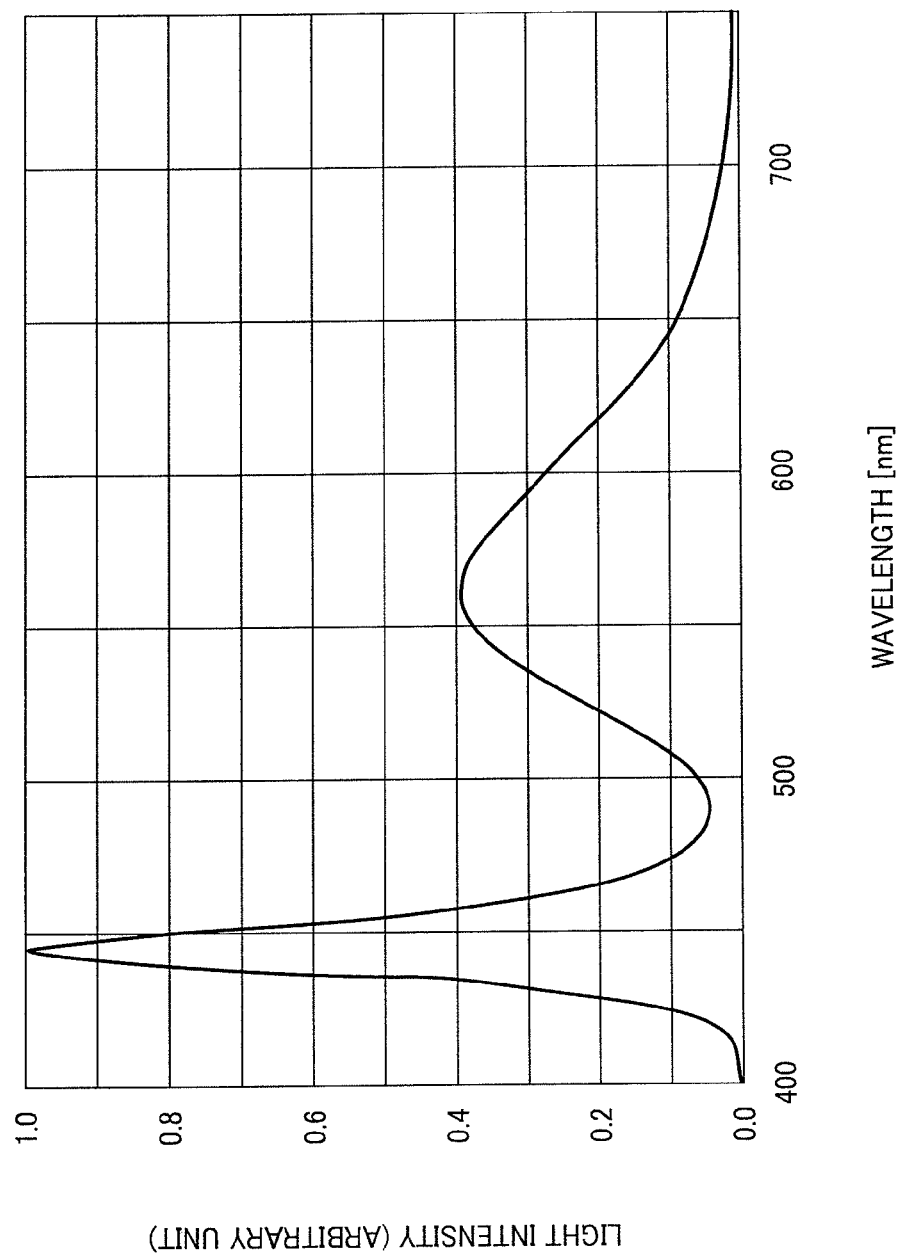
FIG. 17 is a graph illustrating a wavelength characteristic of a light intensity of an LED.

By the way, in the present embodiment, a visible light wavelength region is taken as a range of 430 nm to 700 nm in a wavelength characteristic of a light-emitting intensity of an LED illustrated in FIG. 17.

If a magnitude relation of k/n is satisfied within this range, any materials can be used for the reflecting surface.

In the image reading device, a color document is read by photoelectric conversion elements corresponding to each of color signals of red (R), blue (B) and green (G), and generally each color respectively has a peak sensitivity around 620 nm, 540 nm, and 450 nm.

On the other hand, a white LED, in which phosphor is excited by blue light, generally has the peaks around 450 nm and 560 nm.

Therefore, by setting the wavelength range as described above, it is possible to select materials for the reflecting surface.

As a specifically preferred example of a material combination of the first reflecting surface and the second reflecting surface, aluminum is used for the first reflecting surface and silver is used for the second reflecting surface.

By structured as illustrated in FIGS. 9 and 10, miniaturization is achieved, regardless of the number or intervals of the LEDs 1.

For example, in a case where the lighting unit of the present embodiment is applied to an image reading apparatus, even if an interval between the light source section and the reflecting surface is made wider to reduce any unevenness of light in an arrangement direction by reducing the number of LEDs 1, it is not necessary for the image reading apparatus to be made larger in a down direction from the document surface of FIG. 9.

That is, it is not necessary for the image reading apparatus to be made larger in the vertical direction, and it is easily possible for the image reading apparatus to be miniaturized.

Embodiment 3

[Structure of the Lighting Unit of Embodiment 3]

Figure 18:
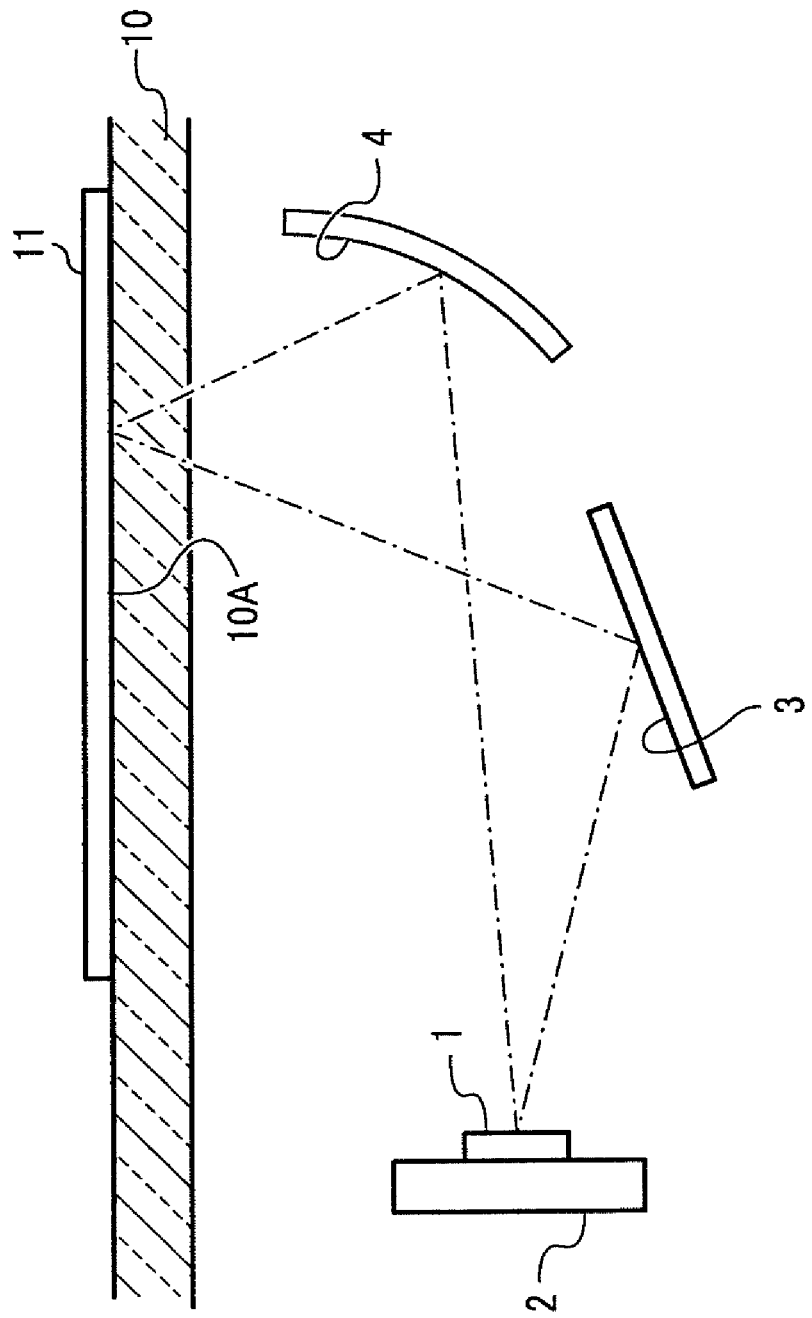
FIG. 18 is a schematic diagram illustrating a structure of a lighting unit of embodiment 3 according to the present invention.

FIG. 18 is a schematic view illustrating a structure of the lighting unit according to embodiment 3.

In the lighting unit according to the present embodiment, at least one of the first reflecting surface 3 and the second reflecting surface 4 is in a concave surface (curved surface) shape.

Specifically, a structure is that a reflecting surface of which a concave surface faces the light source section is applied to the second reflecting surface 4 and is placed.

Details are not illustrated here, however in a direction in which the LEDs 1 are arranged, that is, in a direction perpendicular to an illustrated surface of FIG. 18, the reflecting surface does not have a curvature.

Since structures other than the second reflecting surface 4 are similar to the above embodiment 2, an explanation in details is not illustrated.

[Function and Effect of the Lighting Unit of Embodiment 3]

With the above-described above structure, the illumination light spread to the second reflecting surface 4 which is distant from the LEDs 1 is collected in the image reading area of the document surface, therefore the illumination light amount from the second reflecting surface 4 is increased, and thereby the usage efficiency of light is increased, and an effect of electric power saving is obtained.

Additionally, in the present embodiment, a curved surface is used only for the second reflecting surface 4, however the curved surface is also used for the first reflecting surface 3 likewise, and thereby usage efficiency of light is further enhanced.

Embodiment 4

[Structure of the Lighting Unit of Embodiment 4]

Figure 19:
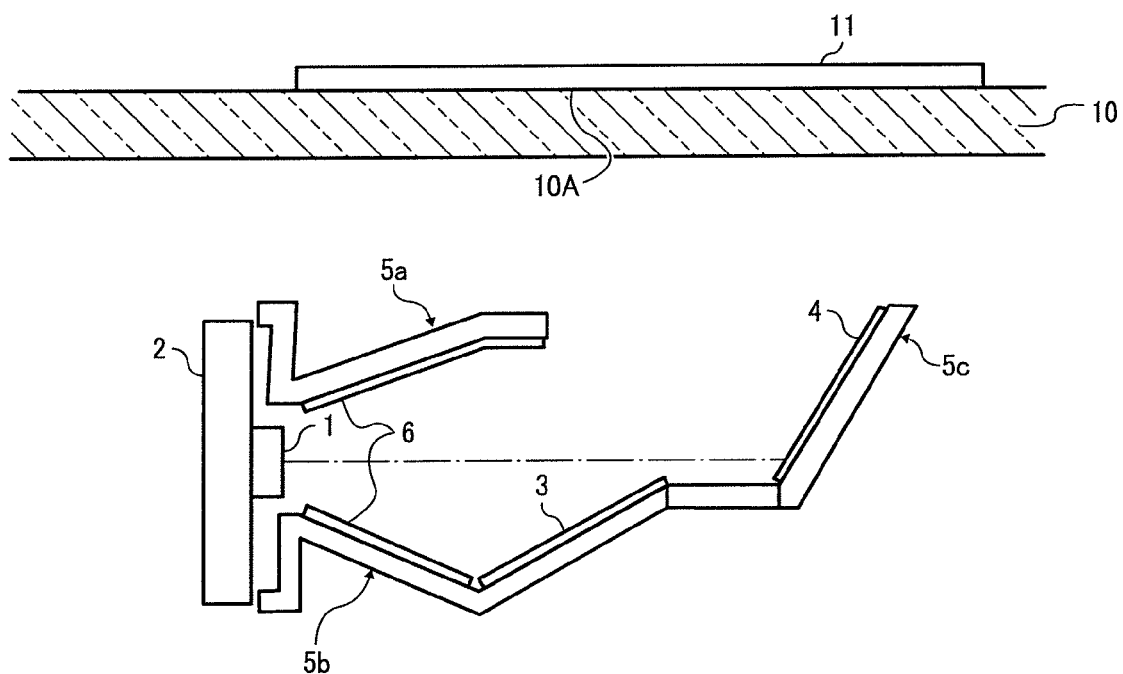
FIG. 19 is a schematic cross-sectional view illustrating a structure of a lighting unit of embodiment 4 according to the present invention.
Figure 20:
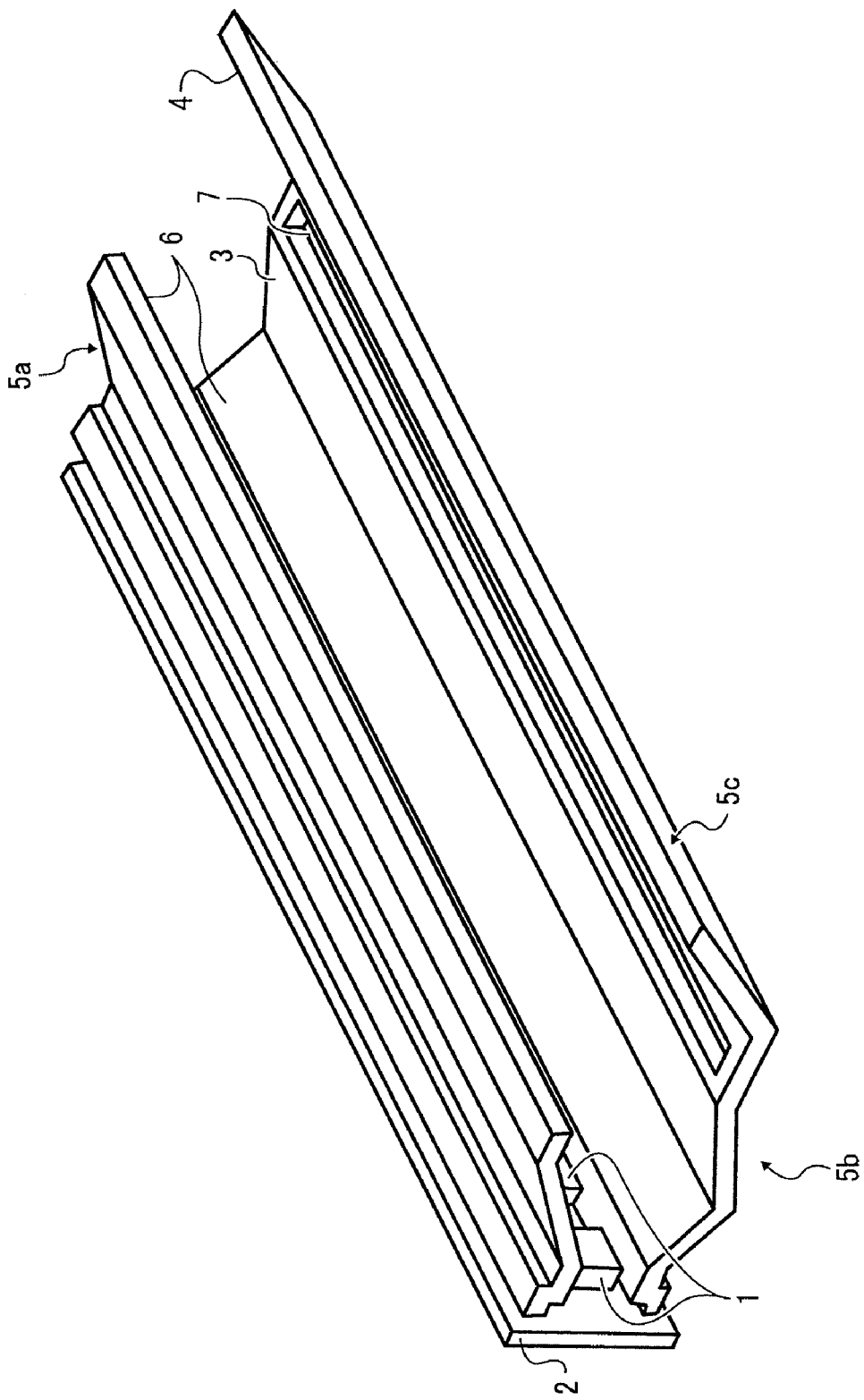
FIG. 20 is a schematic perspective view illustrating a structure of a lighting unit of embodiment 4 according to the present invention.

FIG. 19 is a schematic cross-sectional view illustrating a structure of the lighting unit according to embodiment 4, and FIG. 20 is a schematic perspective view illustrating the structure of the lighting unit according to embodiment 4.

The same members as embodiments 2 and 3 are denoted by the same numerals, and the same members are not explained here.

In the present embodiment, to further enhance usage efficiency of light, a structure is provided such that emitted light spread from the LEDs 1 is collected on the reflecting surface 6 and is capable of being used as the illumination light.

And each reflecting surface 3, 4, 6 is formed on each reflecting section 5a, 5b, 5c, and between the reflecting sections 5b and 5c, an opening section 7 is provided.

As illustrated in FIG. 20, the reflecting sections 5b and 5c may be structured or joined integrally at both ends (both ends in a perpendicular direction to an illustrated surface of FIG. 19) in an arrangement direction of the LEDs 1, and between the reflecting sections 5b and 5c, the opening section 7 which extends in a width direction (the arrangement direction of the LED 1) of the document surface may be provided.

Furthermore, all the reflecting sections 5a, 5b, 5c may be structured of an integrally-formed member.

In this case, the opening section 7 may be an opening in the reflecting sections 5a, 5b, 5c structured by the integrally-formed member, or in a position of the opening section 7, a transparent member having high light transmittance may be provided.

Here, only the first reflecting surface 3 and the second reflecting surface 4 which light the document surface are arranged to satisfy a relationship of k/n explained in embodiment 2, and thereby a similar effect to embodiment 2 is obtained.

The reflecting surfaces 3, 4, 6 can be formed by a sealing of the reflecting surface and methods of vapor-deposition, coating, and so on.

In addition, the reflecting surfaces 3 and 6 may be formed by the same member, or by different members respectively.

In addition, here, the reflecting surface 6 is a flat-surface reflecting surface, however it is possible to be formed in a curved surface such as a paraboloidal surface or the like to collect more of the emitted light from the LEDs 1.

Moreover, as illustrated in embodiment 3, at least one of the first reflecting surface 3 and the second reflecting surface 4 is capable of being formed in a curved surface.

[Function and Effect of the Lighting Unit of Embodiment 4]

With the structure described above, the usage efficiency of light is further enhanced, and the effect of electric power saving is obtained.

Embodiment 5

Figure 21:
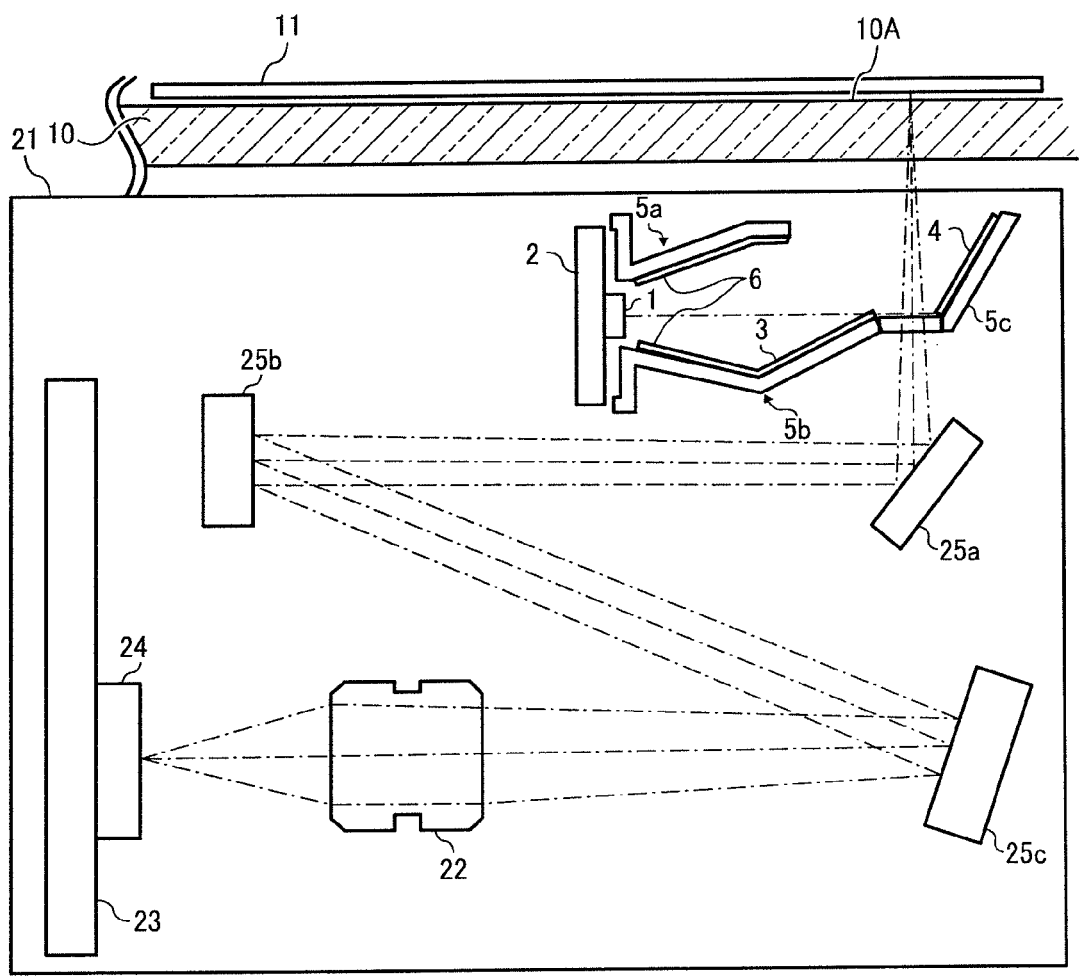
FIG. 21 is a schematic cross-sectional view illustrating a structure of a reading unit as an embodiment in an image reading apparatus according to the present invention.

FIG. 21 is a schematic cross-sectional view illustrating a structure of a reading unit as a part of an image reading apparatus according to embodiment 5.

The present embodiment is provided with the lighting unit of embodiment 4.

[Structure of the Image Reading Apparatus of Embodiment 5]

A reading unit 21 is structured by mirrors 25a, 25b, 25c, an imaging lens 22, a line sensor 24 comprising a CCD or the like, a light-receiving section 23 where the line sensor 24 and an electric circuit, which is not illustrated, are equipped, and on which the line sensor 24 is fixed, and the lighting unit of embodiment 4.

[Function of the Image Reading Apparatus of Embodiment 5]

The reading unit 21 of the present embodiment is placed in an adjacent position under a contact glass 10 and is movable in a right-and-left direction of FIG. 21.

This reading unit moves 21 in the right-and-left direction of FIG. 21 and illuminates a document 11 on a document mounting surface 10A of the contact glass 10 from below. In the meantime, the reflected light from the document is reflected by the mirrors 25a, 25b, 25c provided on the reading unit 21, and is imaged on a light receiving surface of the line sensor 24 by the imaging lens 22.

The imaged image on the light receiving surface of this line sensor 24 is photoelectric-converted to an electric signal by the line sensor 24.

And image information of the document is obtained based on this electric signal (by this apparatus).

[Function and Effect of the Image Reading Apparatus of Embodiment 5]

By use of the lighting unit according to embodiment 4 for the reading unit 21 of embodiment 5, a shadow occurring on a cut-and-paste document or a shadow occurring at an edge of a document is reduced.

Light from the light source section is emitted toward not a document surface but a reflecting surface, therefore the image reading apparatus does not become larger in a vertical direction but is small-sized, and is capable of illuminating evenly with low power consumption.

As illustrated in FIG. 11, an arrangement pitch of the LEDs 1 is denser around end parts of the arrangement of the LEDs 1 than around a center of the arrangement of the LEDs 1, and thereby a decrease in light amount at an edge of a document which occurs outside an angle of view of an image reading lens is compensated for by the lighting unit, and therefore it is possible to read favorably in an entire image reading area.

In addition, in the present embodiment, as an example, an example where the reading unit (the lighting unit) moves with respect to the document, and thereby the reading unit (the lighting unit) scans and reads an image of the document is described, however a structure where the reading unit (the lighting unit) is fixed and the document itself is moved with respect to the image reading area is also capable of providing a similar effect to the above-described.

That is, if the structure is such that the reading unit and the document to be read move relatively with respect to each other and thereby the image of the document is scanned and read, any structures may be applied.

Embodiment 6

FIG. 22 is a schematic cross-sectional view illustrating a structure of an image forming apparatus 200' according to embodiment 6.

The present embodiment is provided with the image reading apparatus of embodiment 5.

[Structure of the Image Forming Apparatus of Embodiment 6]

This image forming apparatus 200' has a reading unit 21 located in an upper part of the image forming apparatus 200' and a writing unit W located in a lower part of the image forming apparatus 200'.

Other structures are similar to embodiment 1, therefore details are not explained.

As for the structure of the writing unit W, parts corresponding to embodiment 1 are denoted by the same numerals as embodiment 1.

[Function and Effect of the Image Forming Apparatus of Embodiment 6]

The image forming apparatus according to embodiment 6 has all the functions and effects of the lighting units of embodiments 2 to 4 and the image forming apparatus of embodiment 5.

That is, according to the image forming apparatus of embodiment 6, a latent image is formed based on image information which is accurately read from a document, and a final image is formed based on this latent image.

Therefore, the image is capable of being formed accurately on a recording medium.

And a document is capable of being copied with few occurrences of shadowing even on a cut-and-paste document, or at an edge of a document. Additionally, it is possible to achieve a small-sized image forming apparatus with low power consumption.

According to the above-explained lighting units, the image reading apparatus, and the image forming apparatus of embodiments 1 to 6, it is possible to illuminate an image reading area evenly, and to prevent the occurrences of shadowing on the cut-and-paste document or at the edge of the document, and to be made small-sized with high efficiency.

Industrial Applicability

As examples of the industrial applicability of the embodiments, a lighting unit, which illuminates a document in a case of scanning a document reading surface, and an image reading apparatus and an image forming apparatus in which the lighting unit is used are explained.

More specifically, it is possible to apply the invention to a lighting unit used for a digital copier, a facsimile or the like such that an image of a document is imaged on a line sensor and image information is read by an image sensor.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lighting unit, comprising:
a light source section wherein a plurality of light-emitting sources are arranged in a direction perpendicular to a direction of each light-emitting optical axis of each light-emitting source and linearly at predetermined intervals; and
a reflecting section which reflects light emitted toward a direction along a document mounting surface from the light source section arranged along the document mounting surface toward an irradiated region of the document mounting surface,
the reflecting section including:
a first reflecting surface disposed closer to the light source section than to the irradiated region; and
a second reflecting surface disposed more distant from the light source section than from the irradiated region,
wherein a ratio of a projected area of the first reflecting surface to a projected area of the second reflecting surface is approximately equal to a reciprocal of a ratio of the square of a distance from the light source section to the first reflecting surface to the square of a distance from the light source section to the second reflecting surface.

2. The lighting unit according to claim 1, wherein a projected area onto a plane perpendicular to the direction of the light-emitting optical axis of an irradiation area of irradiation light on the second reflecting surface is larger than a projected area onto the plane perpendicular to the direction of the light-emitting optical axis of an irradiation area of irradiation light on the first reflecting surface.

3. The lighting unit according to claim 1, wherein the light-emitting optical axis intersects either the first reflecting surface or the second reflecting surface.

4. The lighting unit according to claim 1, wherein a ratio of an extinction coefficient to a refractive index of the second reflecting surface with respect to a visible light region is larger than a ratio of an extinction coefficient of a refractive index of the first reflecting surface with respect to the visible light region.

5. The lighting unit according to claim 4, wherein a range of wavelengths in the visible light region is 430 nm to 700 nm.

6. The lighting unit according to claim 1, wherein the light-emitting sources emit light in which light-emitting intensity in the light-emitting optical axis direction is the highest.

7. The lighting unit according to claim 1, wherein the light-emitting sources are LEDs.

8. The lighting unit according to claim 1, wherein at least one of the first reflecting surface and the second reflecting surface is in a concave-surface shape.

9. The lighting unit according to claim 1, wherein the light-emitting sources are arranged such that adjacent intervals of each light-emitting source become gradually smaller toward both end parts from a center part of which the light-emitting sources are arranged linearly.

10. An image reading apparatus which scans an image of a document placed on a document mounting surface and reads image information of the document by being moved relatively with respect to a document mounting surface, comprising:
a lighting unit, including:
a light source section wherein a plurality of light-emitting sources are arranged in a direction perpendicular to a direction of each light-emitting optical axis of each light-emitting source and linearly at predetermined intervals; and
a reflecting section which reflects light emitted toward a direction along the document mounting surface from the light source section arranged along the document mounting surface toward an irradiated region of the document mounting surface,
the reflecting section having:
a first reflecting surface disposed closer to the light source section than to the irradiated region; and
a second reflecting surface disposed more distant from the light source section than from the irradiated region, wherein a ratio of a projected area of the first reflecting surface to a projected area of the second reflecting surface is approximately equal to a reciprocal of a ratio of the square of a distance from the light source section to the first reflecting surface to the square of a distance from the light source section to the second reflecting surface; and
an image reading section which reads an image of the irradiated region of a document placed on the document mounting surface.

11. An image forming apparatus, comprising:
an image reading apparatus which scans an image of a document mounted on a document mounting surface and reads image information of the document by being moved relatively with respect to the document mounting surface, including:
a lighting unit, having:
a light source section wherein a plurality of light emitting sources are arranged in a direction perpendicular to a direction of each light-emitting optical axis of each light emitting source and linearly at predetermined intervals; and
a reflecting section which reflects a light emitted from the light source section arranged along the document mounting surface toward an irradiated region of the document mounting surface, the reflecting section having:
- a first reflecting surface disposed closer to the light source section than to the irradiated region; and
- a second reflecting surface disposed more distant from the light source section than from the irradiated region, wherein a ratio of a projected area of the first reflecting surface to a projected area of the second reflecting surface is approximately equal to a reciprocal of a ratio of the square of a distance from the light source section to the first reflecting surface to the square of a distance from the light source section to the second reflecting surface; and an image reading section which reads an image of the irradiated region of the document placed on the document mounting surface.

* * * * *